United States Patent
Matsushima

(10) Patent No.: US 10,776,458 B2
(45) Date of Patent: Sep. 15, 2020

(54) INFORMATION PROCESSING SYSTEM, INFORMATION PROCESSING APPARATUS, ACCOUNT REGISTRATION METHOD, AND PROGRAM

(71) Applicant: Hiroyuki Matsushima, Kanagawa (JP)

(72) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/444,084

(22) Filed: Jun. 18, 2019

(65) Prior Publication Data

US 2019/0303544 A1    Oct. 3, 2019

Related U.S. Application Data

(63) Continuation of application No. 14/918,812, filed on Oct. 21, 2015, now Pat. No. 10,372,884.

(30) Foreign Application Priority Data

Oct. 30, 2014    (JP) .................................. 2014-221761

(51) Int. Cl.
  *G06F 21/10*    (2013.01)
  *G06Q 30/00*    (2012.01)
  *G06Q 10/10*    (2012.01)

(52) U.S. Cl.
  CPC .......... *G06F 21/105* (2013.01); *G06Q 10/10* (2013.01); *G06Q 30/0185* (2013.01)

(58) Field of Classification Search
  CPC ... G06F 21/105; G06Q 10/10; G06Q 30/0185
  See application file for complete search history.

(56) References Cited

U.S. PATENT DOCUMENTS

| | | | |
|---|---|---|---|
| 7,130,066 | B1 | 10/2006 | Kanematu |
| 7,528,988 | B2 | 5/2009 | Agehama et al. |
| 8,412,952 | B1 | 4/2013 | Ramzan et al. |
| 8,713,161 | B2 | 4/2014 | Shinomiya |
| 2002/0032664 | A1 | 3/2002 | Ikuta |
| 2003/0097340 | A1 | 5/2003 | Okamoto et al. |
| 2004/0139026 | A1 | 7/2004 | Harada et al. |
| 2005/0007620 | A1 | 1/2005 | Kouno |

(Continued)

FOREIGN PATENT DOCUMENTS

| | | |
|---|---|---|
| JP | 2005-513606 | 5/2005 |
| JP | 2009-104353 | 5/2009 |

(Continued)

OTHER PUBLICATIONS

Extended European Search Report for 15191513.9 dated Mar. 3, 2016.
Japanese Office Action for 2014-221761 dated Oct. 16, 2018.

*Primary Examiner* — Michael R Vaughan
(74) *Attorney, Agent, or Firm* — IPUSA, PLLC

(57) ABSTRACT

An information processing system including at least one information processing apparatus that includes an administration unit configured to administer whether a service is provided to a service use apparatus using an organization, a license, and a user, and an account registration unit configured to receive a subscription for a trial use of the service from the service use apparatus and perform an account registration for the administration unit so that the trial use from the service use apparatus is enabled.

5 Claims, 32 Drawing Sheets

(56) References Cited

U.S. PATENT DOCUMENTS

| | | |
|---|---|---|
| 2005/0044503 A1 | 2/2005 | Richardson et al. |
| 2005/0097543 A1 | 5/2005 | Hirayama |
| 2007/0006324 A1* | 1/2007 | Osada .................... G06F 21/10 |
| | | 726/27 |
| 2009/0150553 A1 | 6/2009 | Collart et al. |
| 2010/0251389 A1 | 9/2010 | Mizutani |
| 2011/0004516 A1 | 1/2011 | Oved |
| 2011/0141513 A1* | 6/2011 | Nakanowatari .... H04N 1/32117 |
| | | 358/1.15 |
| 2011/0202433 A1* | 8/2011 | Yokoyama ............ G06F 21/105 |
| | | 705/28 |
| 2012/0102008 A1 | 4/2012 | Kääriäinen et al. |
| 2012/0317621 A1 | 12/2012 | Mihara |
| 2013/0132247 A1 | 5/2013 | Shimogawa |
| 2013/0346297 A1 | 12/2013 | Zuck et al. |
| 2014/0122349 A1 | 5/2014 | Takatsu et al. |
| 2014/0123240 A1 | 5/2014 | Seo et al. |
| 2014/0149466 A1 | 5/2014 | Sato et al. |
| 2014/0223570 A1 | 8/2014 | Matsushima et al. |
| 2015/0116745 A1 | 4/2015 | Niimura |
| 2018/0240130 A1 | 8/2018 | Takatsu et al. |

FOREIGN PATENT DOCUMENTS

| | | |
|---|---|---|
| JP | 2011-520302 | 7/2011 |
| JP | 2014-092823 | 5/2014 |
| JP | 2014-170522 | 9/2014 |
| JP | 2013-084051 | 3/2015 |

\* cited by examiner

FIG.10

| TENANT ID |
|---|
| TENANT NAME |
| DISPLAY LANGUAGE |
| TIME ZONE |
| STATE |
| COUNTRY |

FIG.11

| TENANT ID |
|---|
| USER ID |
| MAIL ADDRESS |
| PASSWORD |
| USER NAME |
| DISPLAY LANGUAGE |
| TIME ZONE |
| STATE |

FIG.12

| |
|---|
| SERVICE TYPE |
| LICENSE ID |
| SALES REGION |
| COUNTRY |
| TIME ZONE |
| COMMODITY CODE |
| QUANTITY (NUMBER OF APPARATUSES) |
| USE START DATE |
| BILLING START DATE |
| USE END DATE |
| SCHEDULED CANCELLATION DATE |
| STATE |
| PARENT SERVICE TYPE |
| PARENT LICENSE ID |
| REGISTRATION CODE |
| MACHINE TYPE AND MACHINE NUMBER |
| NEXT LICENSE TYPE |
| NEXT LICENSE ID |
| LICENSE TYPE |
| LICENSE MODE |
| QUANTITY (NUMBER OF USERS) |
| NUMBER OF APPARATUSES IN USE |
| NUMBER OF USERS IN USE |
| CONTRACT MODE |

FIG.13

| SERVICE ID |
| --- |
| TENANT ID |
| MACHINE TYPE AND MACHINE NUMBER |
| ACTIVATED DATE |

FIG.14

| TENANT ID |
| --- |
| DEVICE AUTHENTICATION INFORMATION |
| BUSINESS OFFICE INFORMATION |
| CAPABILITY |

INFORMATION PROCESSING SYSTEM, INFORMATION PROCESSING APPARATUS, ACCOUNT REGISTRATION METHOD, AND PROGRAM

CROSS-REFERENCE TO RELATED APPLICATIONS

The present application is a continuation filed under 35 U.S.C. 111(a) claiming the benefit under 35 U.S.C. 120 of an U.S. patent application Ser. No. 14/918,812 filed on Oct. 21, 2015, which is based upon and claims priority to Japanese Patent Application No. 2014-221761 filed on Oct. 30, 2014. The contents of which are incorporated herein by reference in their entirety.

BACKGROUND OF THE INVENTION

1. Field of the Invention

The present invention relates to an information processing system, an information processing apparatus, an account registration method, and a program.

2. Description of the Related Art

When an application is installed in a user terminal such as a personal computer and a smartphone or a use of the application in this user terminal is subscribed, the installation and the subscription are ordinarily done by a user. Meanwhile, when an electronic apparatus such as an image forming apparatus is serviced due to a resource constraint of an apparatus or a support for an error that occurred in the apparatus, an engineer or the like ordinarily visits the user in order to install a program or operate to use the apparatus. Further, a contract of using the electronics apparatus such as an existing image forming apparatus is ordinarily concluded using paper.

In recent years, a new mode of providing a service has been increasing where only a necessary function can be used when a user needs it. The new mode of providing the service is, for example, a software as a service (SaaS) being a new software usage mode where only a function required by a user is freely selected so as to use a service and a cloud computing service where computing resources in the Internet are combined so as to provide a higher value-added service to an end user.

In a case where a service requiring a license is used, a user purchases the license from a sales company of the service. In an information processing system providing the service, a business system administers the license issued for the user and determines whether the service can be provided by the existence of the license (see, for example, Patent Document 1).

Patent Document 1: Japanese Laid-Open Patent Publication No. 2014-170522

SUMMARY OF THE INVENTION

In a cloud service, an ordinary marketing approach is such that a trial period is provided to provide the cloud service for free before concluding a formal contract. As a contract mode, a license (a trial license) for a trial use is issued. In order to enhance a sales promotion effect during the trial use, it is necessary to ease a user's credit at a time of registering an account in issuing the trial license so that a procedure is simplified.

However, in an example of the information processing system, the contract mode is the license of the formal contract accompanied by the business. Therefore, it is difficult to ease the user's credit at a time of registering the account in issuing the trial license and simplify the procedure.

It is a general object of at least one embodiment of the present invention to provide an information processing system that substantially obviates one or more problems caused by the limitations and disadvantages of the related art.

One aspect of the embodiments of the present invention may be to provide an information processing system including at least one information processing apparatus, an administration unit configured to administer whether a service is provided to a service use apparatus using an organization, a license, and a user, and an account registration unit configured to receive a subscription for a trial use of the service from the service use apparatus and perform an account registration for the administration unit so that the trial use from the service use apparatus is enabled.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 10 illustrates a structure of exemplary tenant information.

FIG. 11 illustrates a structure of exemplary user information.

FIG. 12 illustrates a structure of exemplary license information.

FIG. 13 illustrates a structure of exemplary apparatus view information.

FIG. 14 illustrates a structure of exemplary apparatus information.

DETAILED DESCRIPTION OF THE PREFERRED EMBODIMENTS

A description is given below, with reference to the FIG. 1 through FIG. 35 of embodiments of the present invention. Where the same reference symbols are attached to the same parts, repeated description of the parts is omitted.

Reference symbols typically designate as follows:
1: information processing system;
10: user system;
11: user terminal;
12: image forming apparatus;
20: application market providing system;
21: application market providing server;
30: service providing system;
31: authentication agent apparatus;
32: service providing apparatus;
40: service platform providing system;
50: business platform providing system;
51: business terminal;
52: license administration server;
101: application;
102: common service;
103: database (DB);
104: platform application programming interface (API);
111: portal service application;
112: scan service application;
113: print service application;
114: account registration application;
121: scan service unit;
122: print service unit;
123: account registration unit;
131: authentication and permission unit;
132: tenant administration unit;
133: user administration unit;
134: license administration unit;
135: apparatus administration unit;
136: temporary image storing unit;
137: data storing unit;
138: image processing workflow control unit;
139: log collection unit;
141: message queue;
142: worker;
151: log information memory unit;
152: tenant information memory unit;
153: user information memory unit;
154: license information memory unit;
155: apparatus information memory unit;
156: temporary image memory unit;
157: job information memory unit;
158: setup information memory unit inherent in application;
500: computer;
501: input device;
502: display device;
503: external I/F;
503a: recording medium;
504: RAM;
505: ROM;
506: CPU;
507: communication I/F;
508: HDD;
601: controller;
602: operation panel;
603: external I/F;
603a: recording medium;
604: communication I/F;
605: printer;
606: scanner;
611: CPU;
612: RAM;
613: ROM;
614: NVRAM;
615: HDD;
B: bus;
FW: firewall; and
N1-N3: network.

[First Embodiment]<System Structure>

Figure 1:
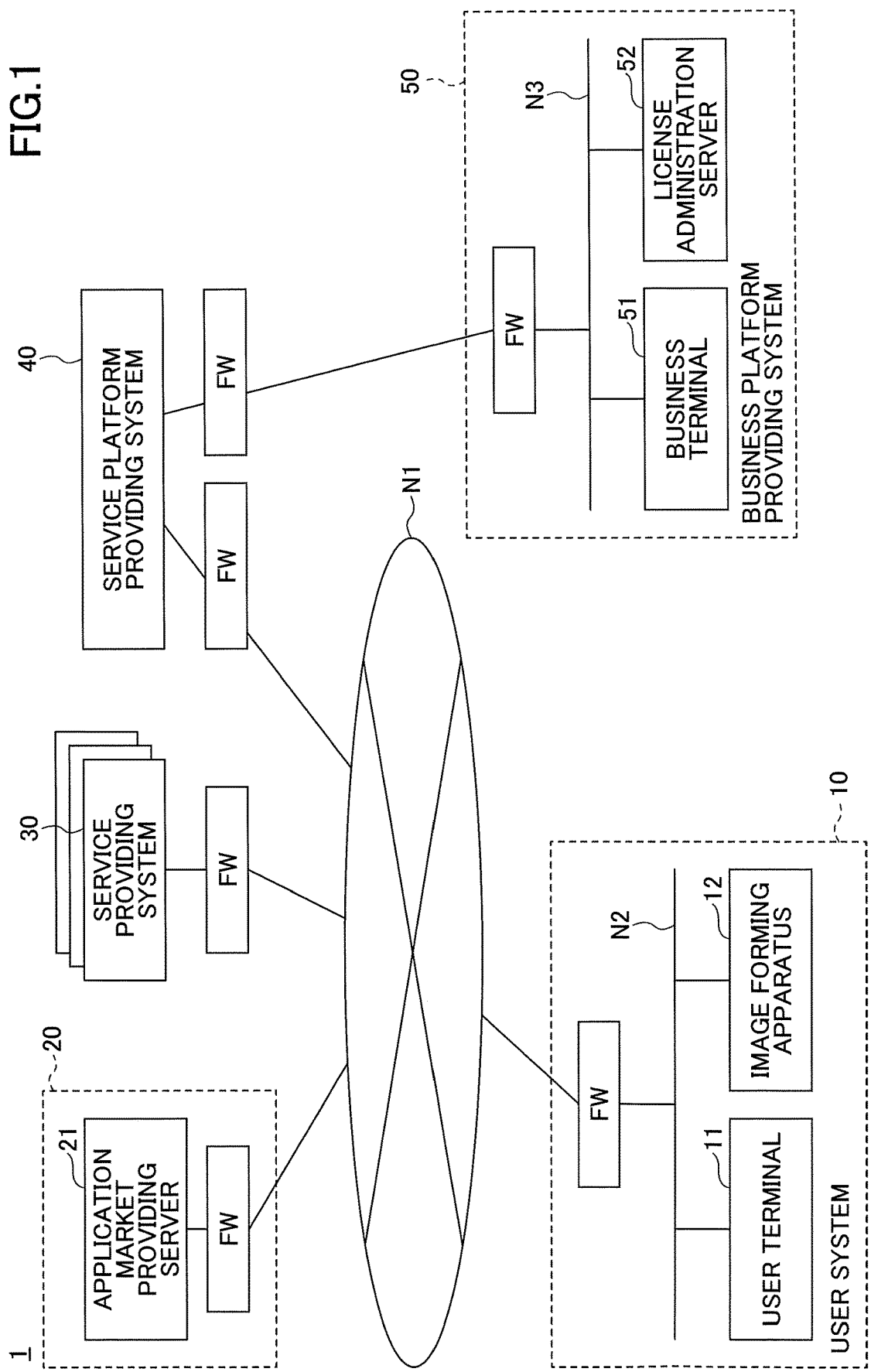
FIG. 1 illustrates a structure of an exemplary information processing system of a first embodiment.

FIG. 1 illustrates a structure of an exemplary information processing system of a first embodiment. The information processing system 1 includes a user system 10, an application market providing system 20, a service providing system 30, a service platform providing system 40, and a business platform providing system 50.

The user system 10, the application market providing system 20, the service providing system 30, and the service platform providing system 40 are connected through a network N1 such as the Internet. Further, the service platform providing system 40 and the business platform providing system 50 are connected through a private line or the like.

The network N2 of the user system 10 is a private network existing inside the firewall FW. The firewall FW detects and blocks off an unauthorized access. A user terminal 11 and an image forming apparatus 12 such as a multifunction peripheral are connected to the network N2. The image forming apparatus 12 is an example of an electronic apparatus by which a user does a trial use of a service.

The client terminal 11 can be substantialized by an information processing apparatus, in which an ordinary operating system (OS) or the like is installed. The user terminal 11 includes a wired or wireless communication means. The user terminal 11 is a smartphone, a mobile phone, a tablet terminal, and a PC, which are operable by the user.

The image forming apparatus 12 is an apparatus having an image forming function such as a multifunction peripheral. The image forming apparatus 12 includes a wireless or wired communication means. The image forming apparatus 12 is an apparatus of performing processes related to image formation such as a multifunction peripheral, a copier, a scanner, a printer, a laser printer, a projector, and an electronic blackboard. Referring to FIG. 1, the number of the user terminal 11 and the number of the image forming apparatus 12 are respectively one, for example. However, the numbers of the user terminal 11 and the image forming apparatus 12 may be respectively plural.

An application market providing server 21 of the application market providing system 20 is connected to the network N1 through a firewall FW. The application market providing server 21 is substantialized by at least one information processing apparatus in which an ordinary OS or the like is installed.

The application market providing system 20 may be provided for each sales region or each sales company. The application market providing server 21 provides an application market screen such as a service view screen and a subscription screen (described below) to the user terminal 11 and the image forming apparatus 12.

The service providing system 30 is connected to the network N1 through the firewall FW. The service providing system 30 provides various services to the user terminal 11 and the image forming apparatus 12. The service providing system 30 is substantialized by at least one information processing apparatus in which an ordinary OS or the like is installed. The services provided by the service providing system 30 is not only a service provided by an operator of the service platform providing system 40 but also a service provided by an external service provider or the like.

The service platform providing system 40 is connected to the network N1 through the firewall FW. The service platform providing system 40 is substantialized by at least one information processing apparatus in which an ordinary OS or the like is installed.

The service platform providing system 40 can perform functions such as authentication and permission, a tenant administration, a user administration, a license administration, an account registration, or the like. The service platform providing system 40 receives a request for the account registration or a request for the login from the user terminal 11 or the image forming apparatus 12. The service platform providing system 40 receives a confirmation request for confirming an authentication ticket and an acquisition request for acquiring user information from the service providing system 30.

A network N3 of the business platform providing system 50 is a private network existing inside of a firewall FW. A business terminal 51 and a license administration server 52 are connected to the network N3. The business terminal 51 and the license administration server 52 may be substantialized by at least one information processing apparatus, in which an ordinary OS or the like is installed.

The business terminal 51 includes a wired or wireless communication means. The business terminal 51 is a smartphone, a mobile phone, a tablet terminal, and a PC, which are operable by a business controller. The business controller can use the business terminal 51 to request the license administration server 52 to issue a license.

The license administration server 52 may perform a function such as a license administration. The license administration server 52 receives a request for issuing the license from the service platform providing system 40 and the business terminal 51. The structure of the information processing system 1 is an example and may be another structure.

<Hardware Structure>

Figure 2:
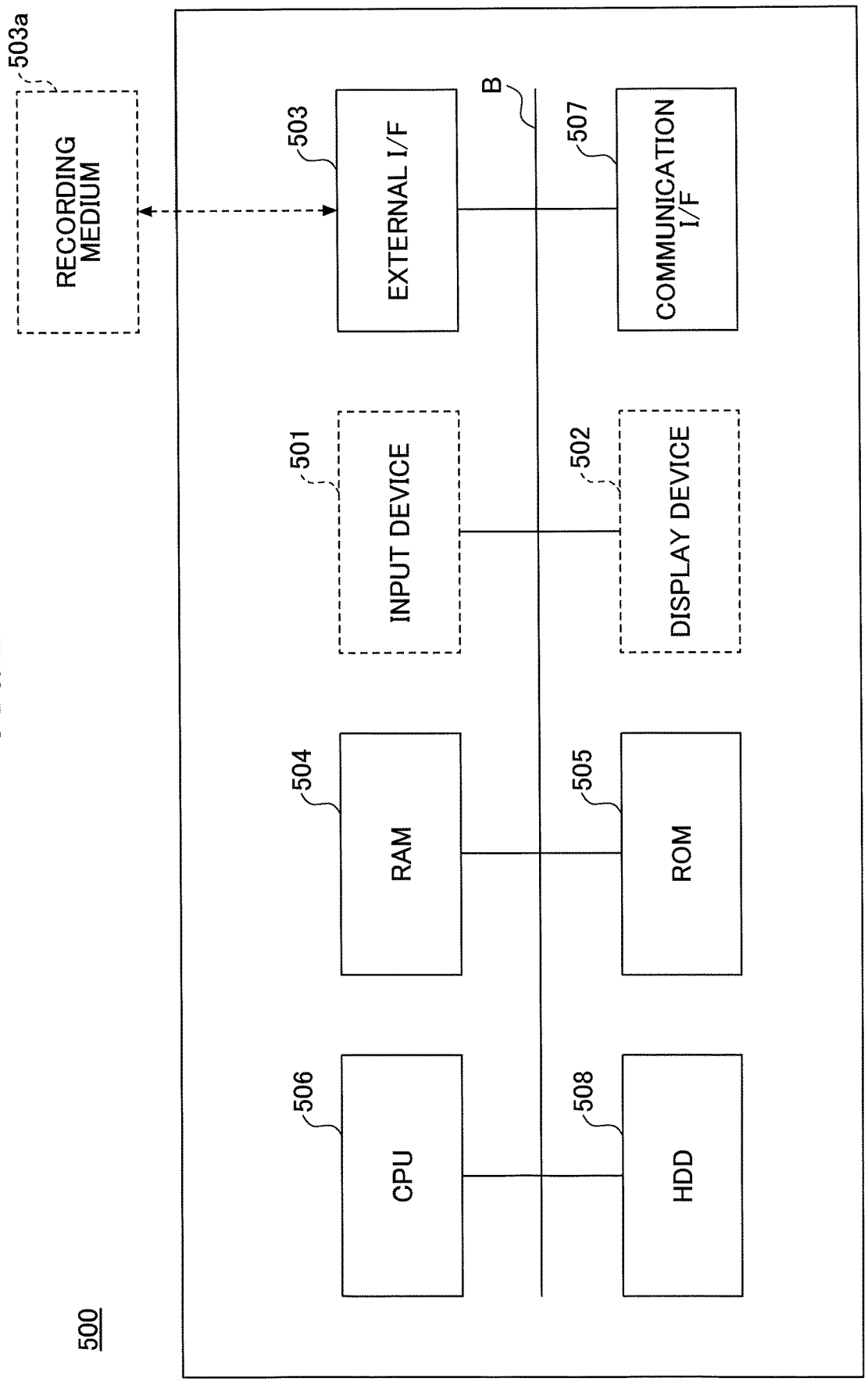
FIG. 2 illustrates a hardware structure of an exemplary computer of the embodiment.

The user terminal 11, the application market providing server 21, the business terminal 51, and the license administration server 52 are substantialized by a computer having a hardware structure as illustrated in, for example, FIG. 2. Further, the information processing apparatus substantializing the service providing system 30 and the service platform providing system 40 is substantialized by a computer having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external I/F 503, a RAM 504, a ROM 505, a CPU 506, a communication I/F 507, a HDD 508, and so on. In the computer 500, the input device 501, the display device 502, the external I/F 503, the RAM 504, the ROM 505, the CPU 506, the communication I/F 507, the HDD 508, and so on are mutually connected by a bus B. It is acceptable to provide a structure such that the input device 501 and the display device 502 are connected when necessary.

The input device 501 includes a keyboard, a mouse, or the like, by which the user inputs various operation signals. The display device 502 includes a display or the like to display a processing result obtained by the computer 500.

The communication I/F 507 is an interface provided to connect the computer 500 with the networks N1, N2, and N3. Thus, the computer 500 can perform data communications through the communication I/F 507.

The HDD 508 is a non-volatile memory device storing programs and/or data. The program and/or data to be stored are an OS being basic software controlling the entire computer 500, application software providing various functions in the OS, and so on.

The external I/F 503 is an interface with an external apparatus. The external apparatus is a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the computer 500. The RAM 504 is a volatile semiconductor memory temporarily storing a program or data.

The CPU 506 is an arithmetic device that reads the program and/or the data from the memory device such as the ROM 505, the HDD 508, or the like. The read program or the read data undergo a process so as to substantialize a control or a function of the entire computer 500.

The user terminal 11, the application market providing server 21, the business terminal 51, and the license administration server 52 of the first embodiment may perform various processes described below by the above hardware structure of the computer 500. Further, the information processing apparatus substantializing the service providing system 30 and the service platform providing system 40 can perform various processes described below by the above hardware structure of the computer 500.

Figure 3:
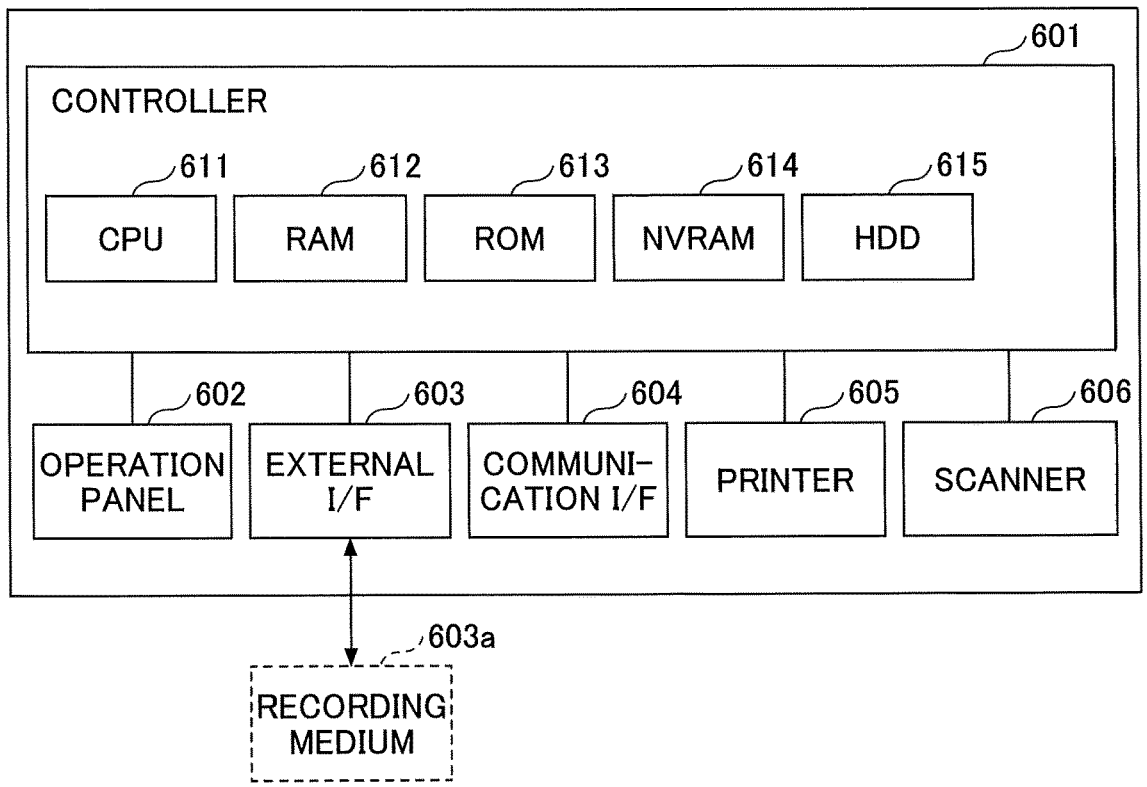
FIG. 3 illustrates a hardware structure of an exemplary image forming apparatus of the first embodiment.

The image forming apparatus 12 illustrated in FIG. 1 is substantialized by a computer having a hardware structure illustrated in, for example, FIG. 3. FIG. 3 illustrates an exemplary hardware structure of the image forming apparatus of the first embodiment. The image forming apparatus 12 illustrated in FIG. 3 includes a controller 601, an operation panel 602, an external I/F 603, a communication I/F 604, a printer 605, a scanner 606, and so on.

The controller 601 includes a CPU 611, a RAM 612, a ROM 613, a NVRAM 614, a HDD 615, and so on. Various programs and data are stored in the ROM 613. The RAM 612 temporarily stores the program and the data. Setup information or the like is stored in the NVRAM 614. Various programs and data are stored in the HDD 615.

The CPU 611 reads the program, the data, setup information, or the like into the RAM 612 from the ROM 613, the NVRAM 614, the HDD 615, or the like, and performs the process. Thus, the CPU 611 substantializes an entire control or functions of the image forming apparatus 12.

The operation panel 602 includes an input unit for receiving an input from the user and a display unit for a display. The external I/F 603 is an interface with an external apparatus. The external apparatus is a recording medium 603a or the like. With this, the output device 14 can read information from the recording medium 603a and/or write information to the recording medium 603a through the external I/F 603. The recording medium 603a is an IC card, a flexible disk, a CD, a DVD, an SD memory card, a USB memory, or the like.

The communication I/F 604 is an interface provided to connect the image forming apparatus 12 with the network N1. Thus, the image forming apparatus 12 can perform data communications through the communication I/F 604. The printer 605 is provided for printing print data on a print paper. The scanner 606 is an apparatus for reading image data (electronic data) from an original manuscript. A description of the hardware structure of the firewall FW, which are illustrated in FIG. 1, is omitted.

<Software Structure>
<<Service Providing System>>

Figure 4:
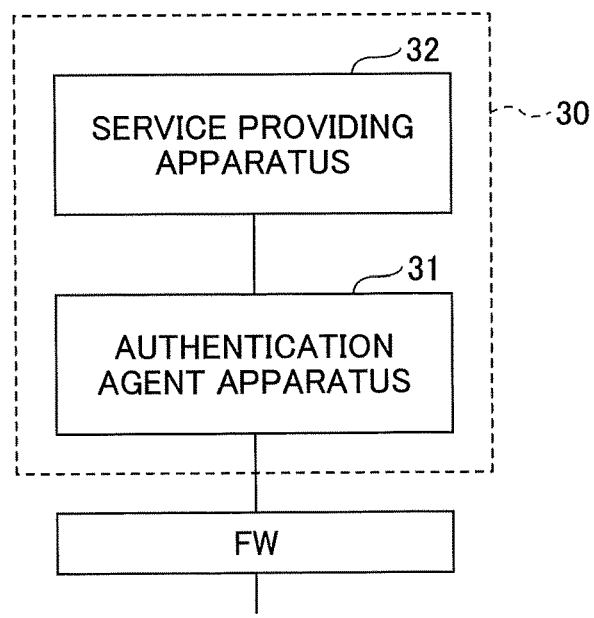
FIG. 4 illustrates a structure of an exemplary service providing system of the first embodiment.

The service providing system 30 of the first embodiment is substantialized by, for example, a structure illustrated in FIG. 4. FIG. 4 illustrates a structure of an exemplary service providing system of the first embodiment. The service providing system 30 illustrated in FIG. 4 has a structure including an authentication agent apparatus 31 and a service providing apparatus 32.

The authentication agent apparatus 31 receives various requests from the user terminal 11 and the image forming apparatus 12 to the service providing apparatus 32. The authentication agent apparatus 31 sends the request, which includes an authorized authentication ticket issued by the service platform providing system 40 and sent from the user terminal 11 or the image forming apparatus 12, to the service providing apparatus 32. The authentication agent apparatus 31 redirects a request, which does not include an authorized authentication ticket and sent from the user terminal 11 and the image forming apparatus 12, to the service platform providing system 40. As such, the authentication agent apparatus 31 sends the request from the user terminal 11 or the image forming apparatus 12 to the service providing apparatus 32 after causing the authorized authentication ticket to be acquired by the user terminal or the image forming apparatus 12.

The service providing apparatus 32 provides a service in response to the request from the user terminal 11 or the image forming apparatus 12. The service providing apparatus 32 inquires the service platform providing system 40 of authenticity of the authentication ticket or requests to acquire information necessary to provide the service.

An example of the service provided by the service providing apparatus 32 is a translation service. The image forming apparatus 12 performs an optical character recognition (OCR) for image data obtained by scanning from an original manuscript. Thereafter, the OCR data are sent to the service providing apparatus 32 and the translation service provided by the service providing apparatus 32 can be used for the OCR data. The user may browse a translation result by accessing the service providing apparatus 32 from, for example, the user terminal 11 or receive the translation result using an email.

<<Service Platform Providing System>>

Figure 5:
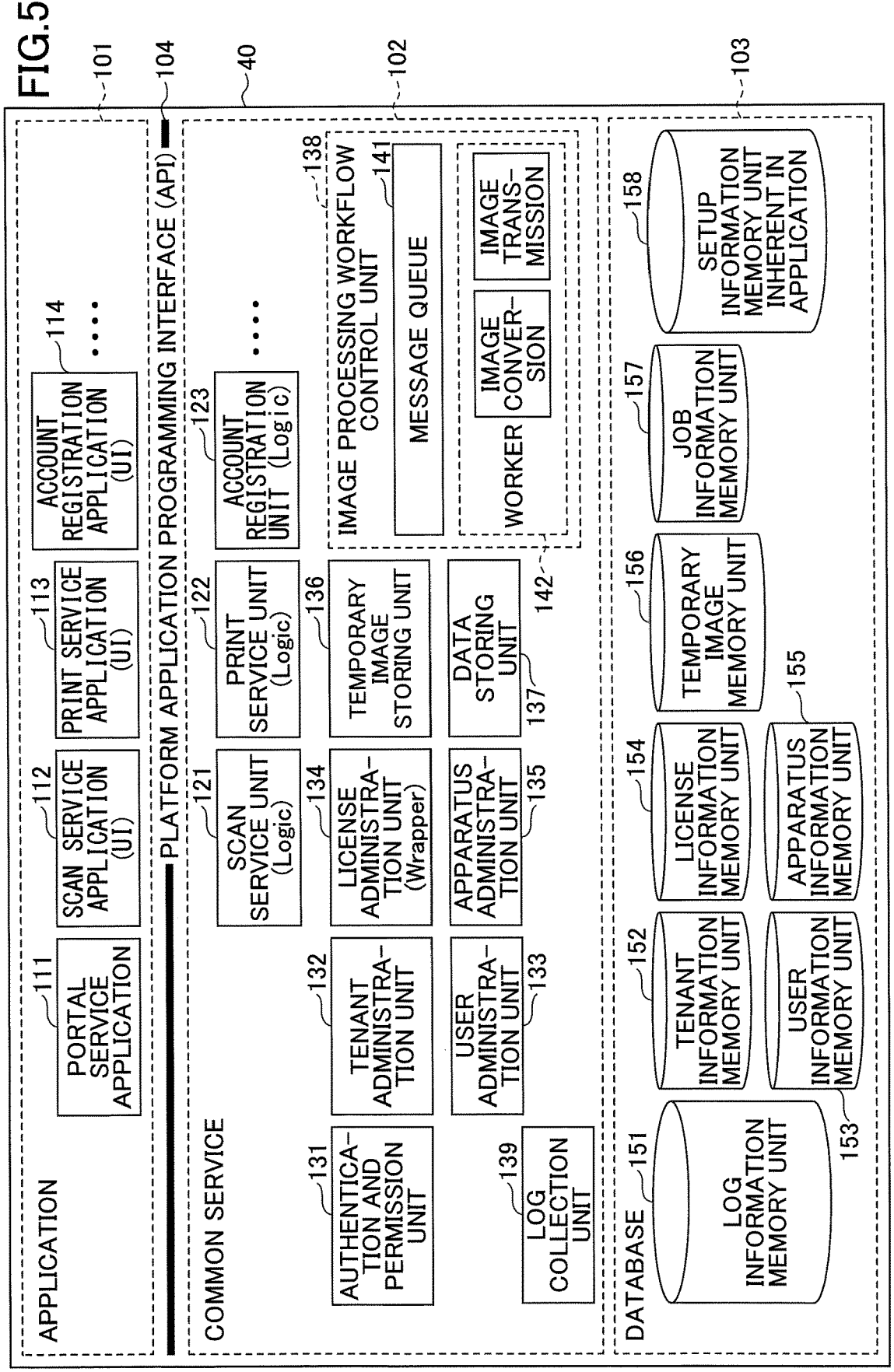
FIG. 5 is a processing block chart of an exemplary service platform providing system of the first embodiment.

The service platform providing system 40 of the first embodiment is substantialized by, for example, a processing block illustrated in FIG. 5. FIG. 5 is a processing block chart of an exemplary service platform providing system of the first embodiment. The service platform providing system 40 substantializes the processing block illustrated in FIG. 5 by executing the program.

Referring to FIG. 5, the service platform providing system 40 substantializes (includes) an application 101, a common service 102, a database (DB), and a platform API 104.

The application 101 includes, for example, a portal service application 111, a scan service application 112, a print service application 113, and an account registration application 114.

The portal service application 111 is an application providing a portal service. The portal service provides a service as an entrance for using the information processing system 1. The scan service apparatus 112 is a user interface (UI) of an application for providing a scan service.

The print service application 113 is a UI of an application providing a print service. The account registration application 114 is a UI of an application providing an account registration service. The application 101 may include another service application.

The UIs of the scan service application 112, the print service application 113, and the account registration application 114 may include Native application displayed or executed by the user terminal 11 or the image forming apparatus 12 or HTML/JavaScript data ("JavaScript" is a registered trademark). The Native application can be compared with the Web application, and a major process of the Native application is performed by the user terminal 11 and the image forming apparatus 12. Meanwhile, a major process of the Web application is performed by the service platform providing system 40.

The platform application programming interface (API) 104 is an interface used by the application 101 such as a portal service application 101 when the application 101 uses the common service 102.

The platform API 104 is an interface previously defined so that the common service 101 receives a request from the application 101. The platform API 104 is structured by, for example, a function, a class, or the like. The platform API 104 can be substantialized by, for example, a Web API, which can be used through the network, when the service platform providing system 40 is structured by multiple information processing apparatuses.

The common service 102 includes a scan service unit 121, a print service unit 122, an account registration unit 123, an authentication and permission unit 131, a tenant administration unit 132, a user administration unit 133, a license administration unit 134, an apparatus administration unit 135, a temporary image storing unit 136, a data storing unit 137, an image processing workflow control unit 138, and a log collection unit 139. The image processing workflow controlling unit 138 includes a message queue 141 and at least one worker (Worker) 142. The worker 142 substantializes a function such as an image conversion or an image transmission.

The scan service unit 121 functions as a logic (API) of the scan service application 112. The print service unit 122 functions as a logic (API) of the print service application 113. The account registration unit 123 functions as a logic (API) of the account registration application 114.

The authentication and permission unit 131 performs the authentication and/or the permission based on a login request received from an office apparatus such as the client terminal 11, the image forming apparatus 12, or the like. The office apparatus collectively designates the user terminal 11, the image forming apparatus 12, or the like.

The authentication and permission unit 131 accesses, for example, a user information memory unit 153, a license information memory unit 154, or the like, which are described below, and authenticates and/or permits the user. Further, the authentication and permission unit 131 accesses, for example, a tenant information memory unit 152 described below, the license information memory unit 154, the apparatus information memory unit 155, or the like to perform a client authentication of the image forming apparatus 12 or the like.

The tenant administration unit 132 administers tenant information stored in the tenant information memory unit 152 described below. The user administration unit 133 administers the user information stored in the user information memory unit 153 to be described below.

The license administration unit 134 administers the license information stored in the license information memory unit 154 described below. The apparatus administration unit 135 administers apparatus information stored in the apparatus information memory unit 155 described below. The temporary image storing unit 136 stores a temporary image in a temporary image memory unit 156 described below and acquires the temporary image from the temporary image memory unit 156. The data storing unit 137 stores data in a job information memory unit 157 described below.

The image processing workflow control unit 138 controls a workflow related to image processing based on a request from the application 101. The message queue 141 includes queues corresponding to types of the processes. The image processing workflow control unit 138 inputs a message of a request related to a process (a job) into the queue corresponding to the type of the job.

The worker 142 monitors the corresponding queue. When the message is input in the queue, the worker 142 performs a process such as an image conversion or an image transmission corresponding to the type of the job. The message input to the queue may be mainly read out (Pull) by the worker 142, or may be provided (Push) from the queue to the worker 142. The log collection unit 139 causes the corrected log information to be stored in, for example, a log information memory unit 151 described below.

The database 103 includes a log information memory unit 151, an tenant information memory unit 152, a user information memory unit 153, a license information memory unit 154, an apparatus information memory unit 155, a temporary image memory unit 156, a job information memory apparatus 157, and a setup information memory unit inherent in application 158.

The log information memory unit 151 stores log information. The tenant information memory unit 152 stores tenant information described below. The user information memory unit 153 stores user information described below. The license information memory unit 154 stores license information described below. The apparatus information memory unit 155 stores apparatus information described below. The temporary image memory unit 156 stores an temporary image. The temporary image is a file or data such as a scanned image processed by, for example, the worker 142.

The job information memory unit 157 stores information (job information) of the request related to a process (a job). The setup information memory unit 158 inherent in the application stores setup information inherent in the application 101.

The service platform providing system 40 functions as an integrated platform for providing a common service such as the authentication and permission or a workflow related to image processing and a service group for providing an application service such as a scan service, a print service, or the like.

The integrated platform is structured by, for example, the common service 102, the database 103, and the platform API 104. Further, the service group is formed by, for example, the application 101. As described, in the service platform providing system 40 illustrated in FIG. 5, the service group is separated from the integrated platform.

In the service platform providing system 40 illustrated in FIG. 5, by adopting the structure where the service group and the integrated platform are separated, it is possible to easily develop the application 101 using the platform API 104. The service platform providing system 40 illustrated in FIG. 5 can easily develop the service providing apparatus 32 using the platform API 104.

A mode of classifying the processing blocks of the service platform providing system 40 illustrated in FIG. 5 is an example. It is unnecessary that the application 101, the common service 102, and the database 103 are classified in a hierarchy illustrated in FIG. 5. As long as the processes of the service platform providing system 40 of the first embodiment can be performed, a relationship of the hierarchy illustrated in FIG. 5 is not specifically limited.

<<Arrangement of UI and Logic>>

Figure 6:
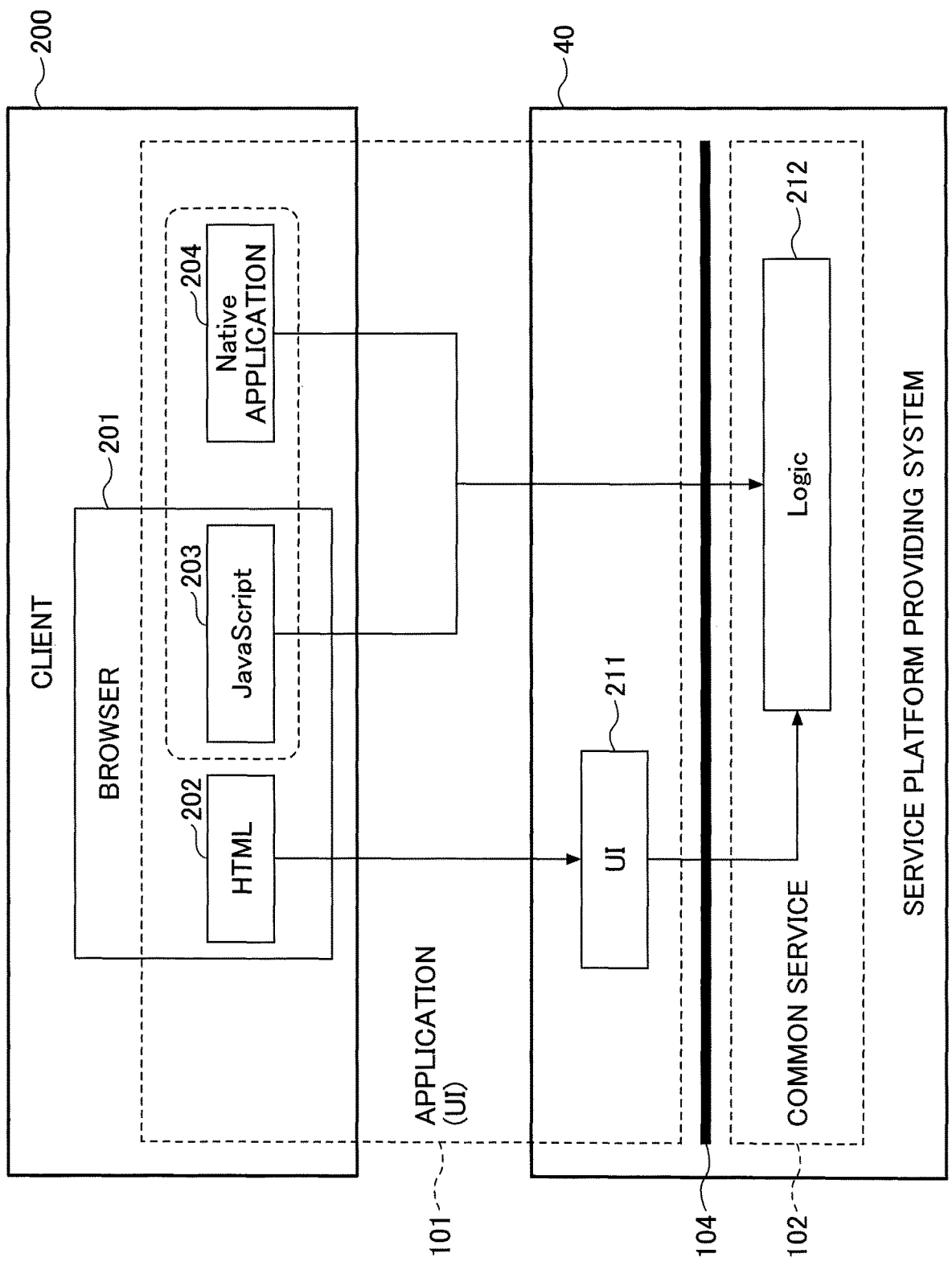
FIG. 6 illustrates an exemplary arrangement of a UI and a logic (API).

In the service platform providing system 40 illustrated in FIG. 5, a UI or a login (API) of the application 101 such as the scan service application 112 receives an access from a client 200 such as the user terminal 11 and the image forming apparatus 12 as illustrated in FIG. 6. FIG. 6 illustrates an exemplary arrangement of the UI and the logic (API) of the first embodiment.

The UI 211 of the service platform providing system 40 illustrated in FIG. 6 interprets a user operation performed in the client 200, calls a logic 212 from the platform API 104, and generates HTML data 202. A browser 201 of the client 200 changes a screen by the HTML data 202 generated on a side of the service platform providing system 40.

The browser 201 may use a single page Web application (SPA). The browser 201 of the client 200 downloads HTML/JavaScript/CSS data from the service platform providing system 40. The browser 201 calls the logic 212 of the service platform providing system 40 using JavaScript data by, for example, Ajax and may change the screen by a DOM operation.

Here, Ajax stands for Asynchronous JavaScript+XML. Ajax is an example of an implementation mode of a Web application which uses an HTTP communication function of JavaScript installed in the browser and performs a process without reloading the web page. The DOM operation is an exemplary operation of accessing values of each element of the HTML data and dynamically overwriting.

The client 200 may use a Native application 204 installed in a NativeOS. The Native application 204 interprets the user operation on the side of the client 200, calls the logic 212, and changes the screen depending on the result.

Referring to FIG. 6, the UI 211 of the service platform providing system 40 calls the logic 212 from the platform API 104. In a manner similar thereto, the UI of the service providing system 30 may call the logic 212 from the platform API 104.

<<Collaboration Between the Service Providing System and the Service Platform Providing System>>

Figure 7:
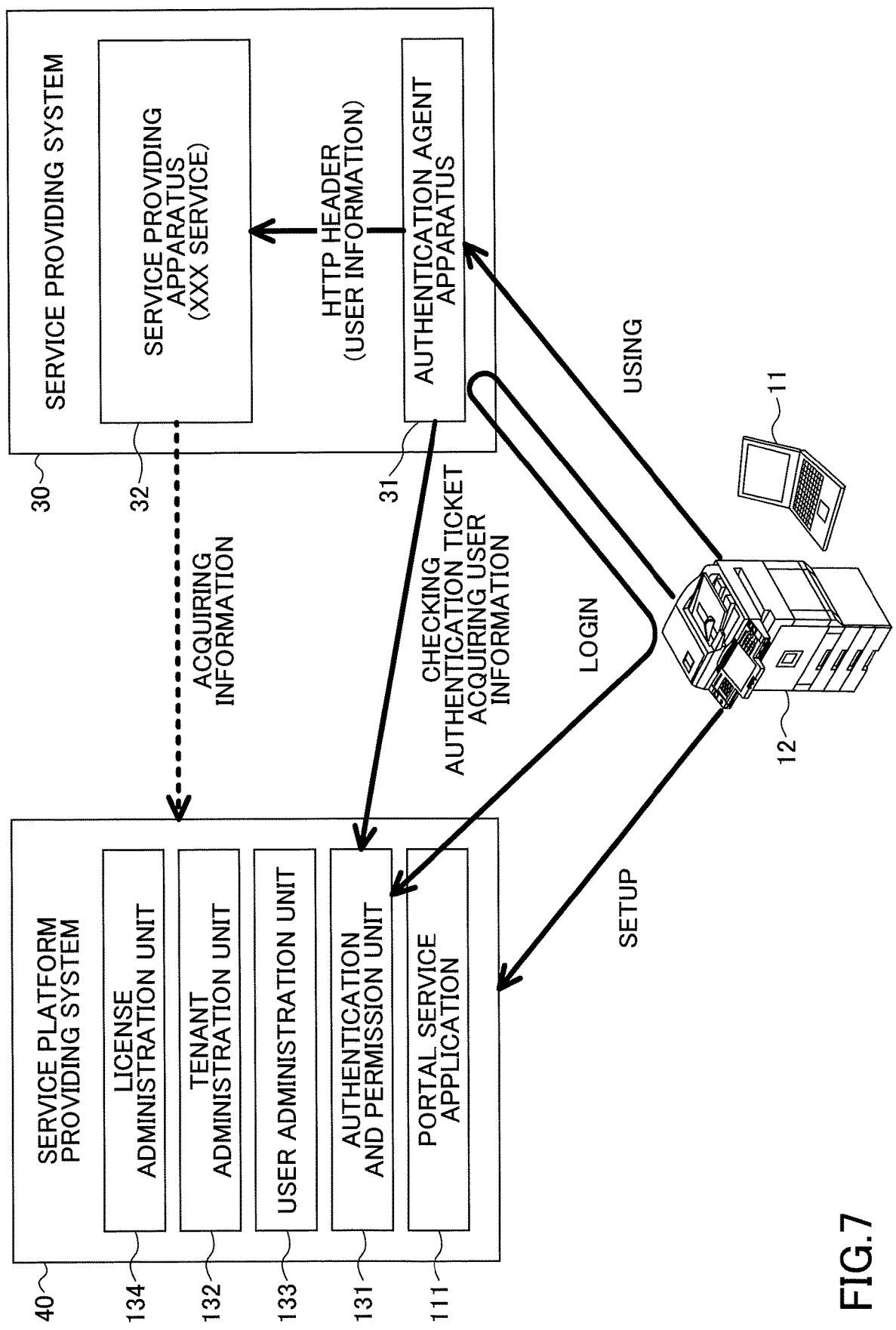
FIG. 7 illustrates a structure of an exemplary service providing procedure of providing a service to an image forming apparatus.

The service providing system 30 and the service platform providing system 40 collaborates as illustrated in FIG. 7 so as to provide a service to the user terminal 11 and the image forming apparatus 12. FIG. 7 illustrates a structure of an exemplary service providing procedure of providing a service to an image forming apparatus.

Referring to FIG. 7, the user using the information processing system 1 can do various setups to the service platform providing system 40 from the user terminal 11 and the image forming apparatus 12. In a case where the service provided by the service providing system 30 is used by the user terminal 11 or the image forming apparatus 12, the user requests the service providing system 30 so from the user terminal 11 or the image forming apparatus 12.

As described above, the authentication agent apparatus 31 of the service providing system 30 redirects the request, which does not include the authorized authentication ticket and sent from the user terminal 11 and the image forming apparatus 12, to the service platform providing system 40. The user operating the user terminal 11 or the image forming apparatus 12 does a login process for the service platform providing system 40 and acquires the authorized authentication ticket.

The user terminal 11 or the image forming apparatus 12 requests the service providing system 30 to use the service providing system 30 while the authorized authentication ticket thus acquired is included in the request. The authentication agent apparatus 30 of the authentication agent apparatus 31 inquires the service platform providing system 40 to check the authenticity of the authentication ticket included in the request from the user terminal 11 or the image forming apparatus 12. In a case where it is necessary to add user information to the request from the user terminal 11 or the image forming apparatus 12, the authentication agent apparatus 31 may inquire the service platform providing system 40 and may add the user information to an HTTP header or the like.

The service providing apparatus 32 provides a service in response to the request from the user terminal 11 or the image forming apparatus 12. The service providing apparatus 32 uses information acquired from the service platform providing system 40 so as to provide the service in response to the request from the user terminal 11 or the image forming apparatus 12.

<<Issuance of License>>

In the information processing system 1 of the first embodiment, a license for a formal contract and a license (a trial license) for a trial use are handled as a contract mode. In the information processing system 1 of the first embodiment, the license for the formal contract and the trial license are issued as follows.

Figure 8:
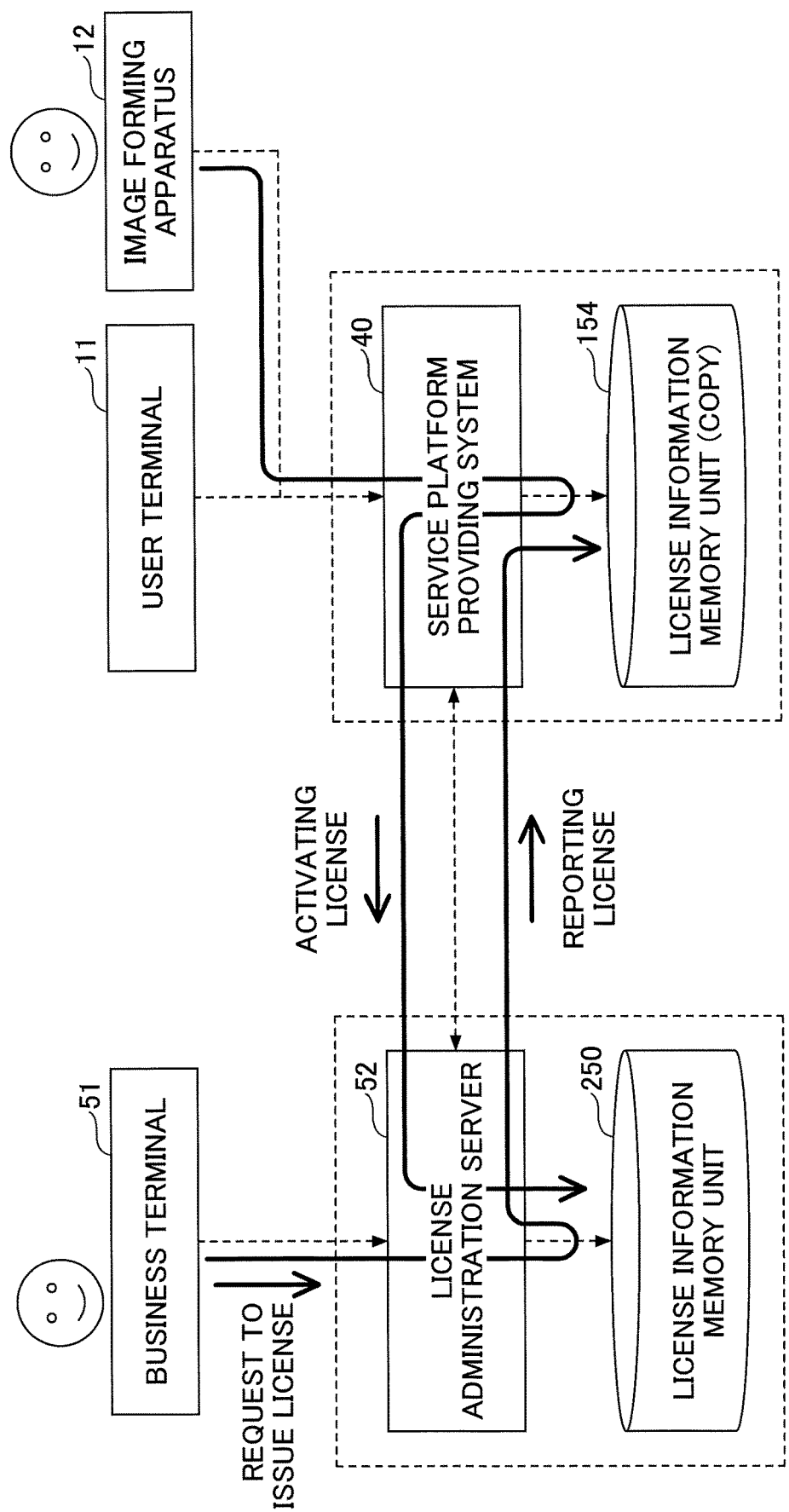
FIG. 8 illustrates a structure of an exemplary procedure of issuing a license for a formal contract.

FIG. 8 illustrates a structure of an exemplary procedure of issuing the license for the formal contract. The business controller uses the business terminal 51 to request the license administration server 52 to issue the license. The license administration server 52 requested to issue the license from the business controller issues the license for the formal contract and causes the issued license to be stored in the license information memory unit 250. The license administration server 52 and the license information memory unit 250 are located in a data center near, for example, the business operation center (e.g., the head office) so as to maintain a centralization of the administration.

Further, the license administration server 52 reports (performs a license report) the issued license to the service platform providing system 40 so as to cause the license information memory unit 154 to store a copy of the license.

The service platform providing system 40 is located in, for example, a data center near the user so as to improve a response performance. Multiple data centers, in which the service platform providing system 40 is located, may be provided.

The license activation is requested by, for example, a customer engineer (CE) from the user terminal 11 or the image forming apparatus 12 to the service platform providing system 40. The service platform providing system 40 receiving the request for the license activation activates a copy of the license, which is stored in the license information memory unit 154 and is an object to be activated.

Further, the service platform providing system 40 reports the license activation to the license administration server 52. The license administration server 52 activates the license, which is stored in the license information memory unit 250 and is an object to be activated.

Referring to FIG. 8, the business controller or the like requests to issue the license for the formal contract and the license administration server 52 receives the request from the business controller or the like. Further, the activation of the license for the formal contract is requested to the service platform providing system 40 by a customer engineer or the like.

Figure 9:
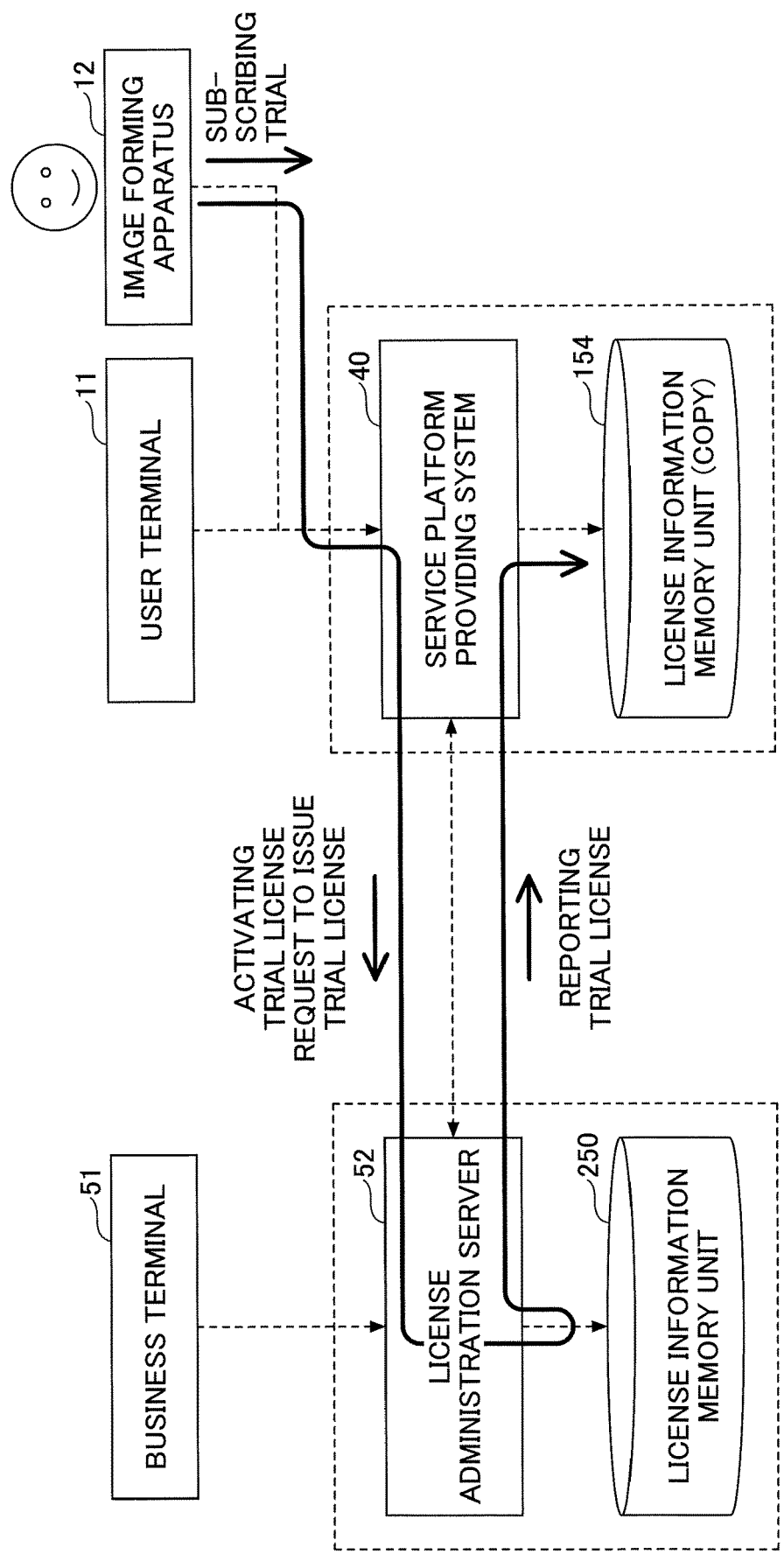
FIG. 9 illustrates a structure of an exemplary procedure of issuing a trial license.

FIG. 9 illustrates a structure of an exemplary procedure of issuing the trial license. For example, the user who is going to use the image forming apparatus 12 subscribes to a trial (a trial use) from the image forming apparatus 12 to the service platform providing system 40. The service platform providing system 40 receiving a trial subscription from the user requests the license administration server 52 to issue the trial license.

The license administration server 52 requested to issue the trial license from the service platform providing system 40 issues the trial license and causes the issued trial license to be stored in the license information memory unit 250. Further, the license administration server 52 reports (performs a trial license report) the issued trial license to the service platform providing system 40 so as to cause the license information memory unit 154 to store a copy of the trial license.

The service platform providing system 40, to which the trial license is reported, activates the copy of the trial license, which is stored in the license information memory unit 154 and is an object to be activated.

Further, the service platform providing system 40 reports the trial license activation to the license administration server 52. The license administration server 52 activates the trial license, which is stored in the license information memory unit 250 and is an object to be activated.

Referring to FIG. 9, the trial subscription being a trigger to issue the trial license is received from the user using the image forming apparatus 12 by the service platform providing system 40. The trial license subscription is received by the license administration server 52 from the service platform providing system 40, to which the trial license is reported. Although, referring to FIG. 9, the trial license subscription is reported from the service platform providing system 40 to the license administration server 52, the trial license subscription may be reported from the license administration server 52 to the service platform providing system 40.

<<Information>>

FIG. 10 illustrates a structure of exemplary tenant information. Data items of the tenant information illustrated in FIG. 10 are a tenant ID, a tenant name, a display language, a time zone, a state, a country, and so on.

The tenant ID is information uniquely specifying groups (organizations) such as companies, departments, or the like. The tenant ID is not limited to a meaning of the tenant and may be information for identifying, for example, a contract. The tenant ID is uniquely determined.

The tenant name represents the name of the group such as the company or the department. The display language represents a language used for displaying the group name such as the company and the department. The display language represents a displayed language for an access from a browser and a language used for a body text of a mail. The time zone represents a standard time used by the group such as the company or the department. The state represents a state of the group such as the company or the department. The country represents a name of a country to which the company or the department belongs.

FIG. 11 illustrates a structure of exemplary user information. The user information illustrated in FIG. 11 includes the tenant ID, a user ID, a mail address, a password, a user name, the display language, the time zone, the state, and so on.

The mail address and the password are information (user specifying information) for specifying the user. The user specifying information may be the user ID or the user name instead of the mail address. The password is not indispensable. The mail address needs to be unique. Further, the user ID administered using the same tenant ID is unique. The user IDs administered using different tenant IDs may overlap.

Further, identification information of an electronic medium (for example, an IC card) owned by the user may be used as the user specifying information. The electronic medium owned by the user may be an IC card, a mobile phone, a tablet terminal, an electronic book reader, or the like. Information identifying the electronic medium is a card ID, a serial ID, a telephone number of the mobile phone, profile information of a terminal, or the like. It is possible to combine the information identifying the electronic medium in using the information identifying the electronic medium.

The mail address is a mail address of the user. The display language represents a language for displaying the user name. The display language represents a displayed language for an access from a browser and a language used for a body text of a mail. The time zone represents a standard time used by the user. The state represents the state of the user.

FIG. 12 illustrates a structure of exemplary license information. Data items of the license information are a service type, a license ID, a sales region, a country, a time zone, a commodity code, a quantity (the number of apparatuses), a use start date, a billing start date, a use end date, a scheduled cancellation date, a state, a parent service type, a parent license ID, a registration code, a machine type and machine number, a next license type, a next license ID, a license type, a license mode, a quantity (the number of users), the number of apparatuses in use, the number of users in use, a contract mode, and so on.

The service type is information for specifying a type of the service such as a portal service, a scan service, a print service, or the like. The license ID is identification information of identifying the license for the formal contract and the license (the trial license) for the trial use. The license ID is the tenant ID in a case where the license is the tenant license, and is the service ID in a case where the license is the service license.

The sales region is information indicative of a region where the license is sold. The country represents the name of the country where the license is used. The time zone indicates a standard time of the country where the license is used. The commodity code is identification information for identifying a commodity corresponding to the license. The quantity (the number of apparatuses) is information indicative of the quantity (the number) of the apparatuses enabled to use the service by the license.

The use start date is information indicative of a date when the license is activated. The billing start date is information indicative of a date when billing is started and the same date as the use start date or later (for example, the first day of the next month). The use end date is information indicative of a license deadline on display. The use end date is, for example, one year after the billing start date. The scheduled cancellation date is information indicative of a date when the license is to be inactivated. The state is information indicative of a state of the license. The state of the license includes, for example, a provisional registration indicating that the license is before use, a registration indicating that the license is now being used, and a cancellation indicating that the license is after use.

In a case of the service license, the tenant is set to the parent service type. In a case of the service license, the tenant ID is set to the parent license ID. In a case of the tenant license, the registration code is set. The registration code is input at a time of opening the tenant.

The machine type and machine number is set in the case of the service license. The machine type and the machine number is information specifying the apparatus as an object of the license. In case of a volume license where multiple apparatuses to be licensed exist, the machine type and machine number of the apparatus activated the earliest is set.

The next license type is set in a case of the updated service license. The next service type has the same value as the service type. The next license ID is set in a case of the updated service license. The next license ID is a service ID of the license to be activated after completing the use of the updated service license.

The license type is information for specifying the type of the service license such as an apparatus license or a user license. The license type is information for setting the apparatus, the user, or the like, which are an object of limiting the use, by the service license. The license mode is information indicative of whether the use is permitted with the own service license in combination with the service license of another type or the use is permitted with only the own service license.

For example, the information such as "only the apparatus license" or "apparatus license+user license" is set to the license mode. In a case where the license mode is "only the apparatus license", the use of the service is permitted when the service license whose license type is "the apparatus license" is registered. In a case where the license mode is "the apparatus license+the user license", the use of the service is permitted when the service license whose license type is "the apparatus license" and the service license whose license type is "the user license" are registered.

The quantity (the number of users) is information indicative of the number of the users who can use the service by the license. The number of apparatuses which are being used is information indicative of the number of the apparatuses where the service can be used by the license. The number of users in use is information indicative of the number of the users who can use the service by the license. The contract mode is information indicative of whether the license is the license for the formal contract or the license (the trial license) of a trial contract.

In the license information illustrated in FIG. 12, the quantity (the number of apparatuses) and the quantity (the number of users) are separately provided as the data items. However, the quantity (the number of apparatuses) and the quantity (the number of users) may be treated as the same data item.

Referring to the license information of FIG. 12, the tenant license and the service license are in a relationship between a parent and the child. In the license information illustrated in FIG. 12, the tenant license corresponds to a parent license and the service license corresponds to a child license. The tenant license to be the parent license is set to the parent license ID. In the license information illustrated in FIG. 12, although the relationship between parent and child of the tenant license and the service license is illustrated, a relationship of more than 3 hierarchies such as a relationship among the parent, the child, and the grandchild may exist.

The tenant license is necessary to use the service platform providing system 40. Without the tenant license, the service platform providing system 40 cannot open the tenant. By handling the tenant license in the same data format as that of the service license, it becomes possible to bill the tenant itself or provide a difference in a service level (a speed or a capacity) depending on the amount of the bill. The service platform providing system 40 provides a service to multiple tenants and provides a user administration independent for each tenant.

The service platform providing system 40 performs an access limitation by preventing the data from being referred to between the tenants. Therefore, it is necessary to open the tenant before using all the services in the service platform providing system 40. Because the relationship between the parent and the child has a very flexible data structure, it is possible to represent a grouping of the licenses in, for example, a volume license.

In a case of the volume license, the activated apparatus is administered by activated apparatus view information as illustrated in FIG. 13. FIG. 13 is a structural view of exemplary activated apparatus view information. The activated apparatus view information is stored in, for example, the license information memory unit 154.

Referring to FIG. 13, data items of the activated apparatus view information are the service ID, the tenant ID, the machine type and machine number, the activated date, and so on. The service ID is identification information for identifying the service license.

The tenant ID and the machine type and machine number are information of the tenant ID and information of the machine type and machine number of the apparatus activated using the service ID. The activated date is set to be a date when the apparatus is activated using the service ID.

FIG. 14 illustrates a structure of exemplary apparatus information. Referring to FIG. 14, the apparatus information includes data items such as a tenant ID, device authentication information, business office information, capability and so on. The device authentication information is provided for a device authentication, by which it is determined that the office apparatus is provided with specific conditions.

The device authentication information may be an ID indicating that a specific application is installed in the office apparatus, a machine type number indicating that the machine is a specific office apparatus, or the like. The business office information represents, for example, a business office where the office apparatus is installed. For example, the capability represents a performance of the office apparatus.

<Detailed Process>

In the information processing system 1 of the first embodiment, use cases where the user is provided with the service using the trial license are three as follows.

The first use case is that a user without having an opened tenant subscribes to a trial and does a trial use of a service. The second use case is that a user having an opened tenant subscribes to a trial and does a trial use of a service. The third use case is that a user having an opened tenant does a user registration for a service for which a trial subscription has been done and does a trial use of the service.

<<First Use Case>>

Figure 15:
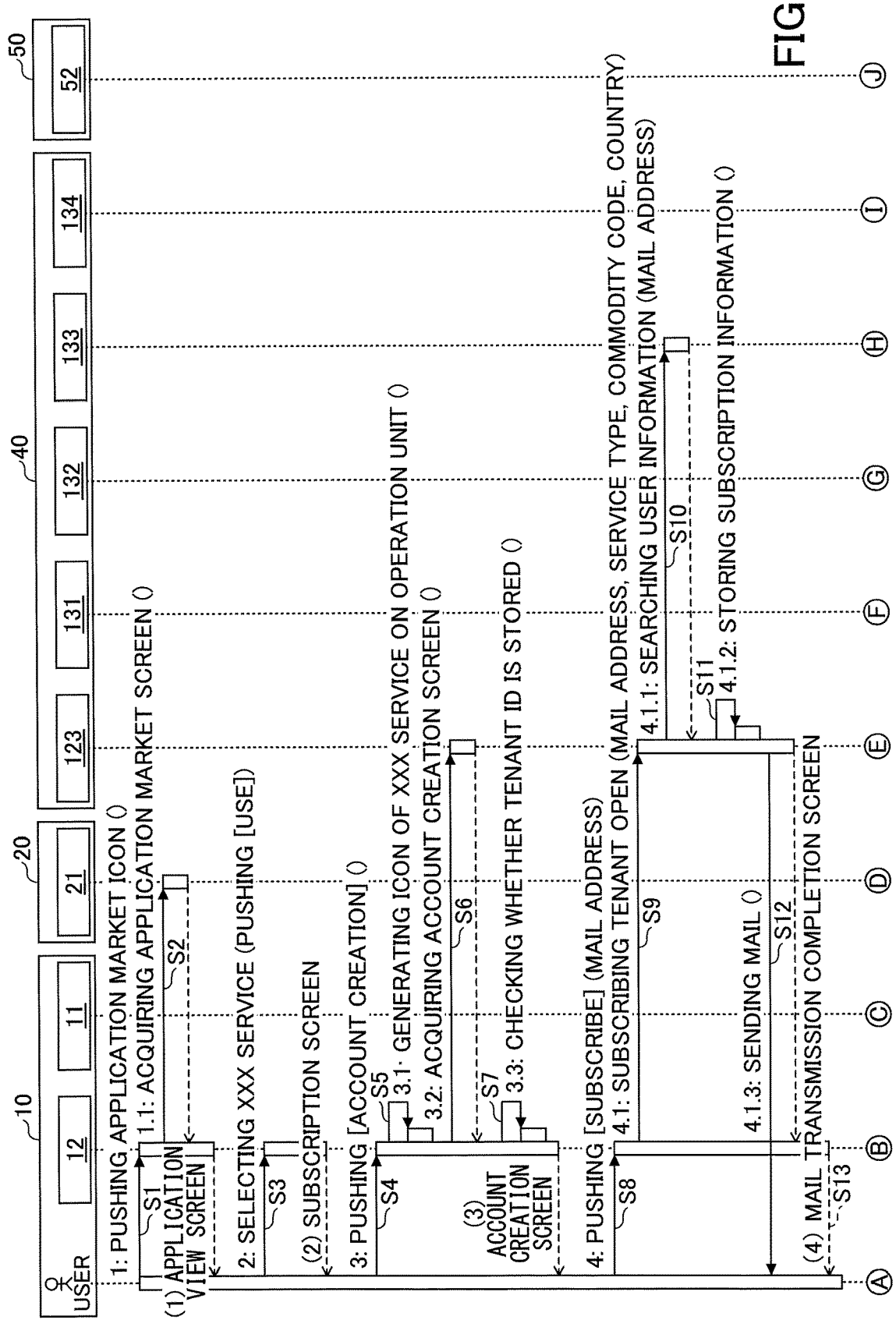
FIG. 15 is a sequence chart of an exemplary procedure where a user without having an opened tenant subscribes to a trial.
Figure 16:
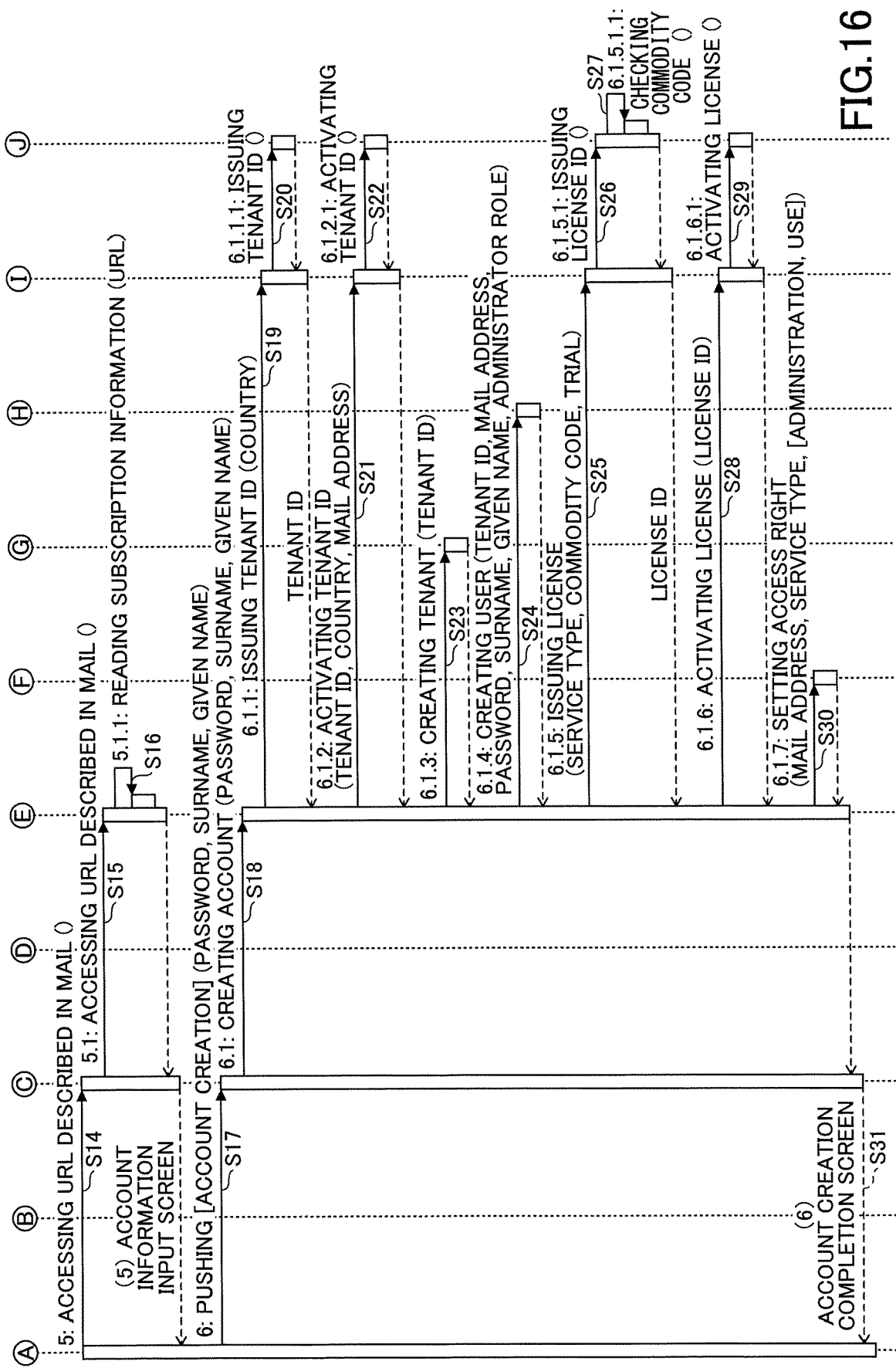
FIG. 16 is another sequence chart of the exemplary procedure where the user without having the opened tenant subscribes to the trial.

FIGS. 15 and 16 are sequence charts of an exemplary procedure where the user without having the opened tenant subscribes to the trial. In step S1, the user operates the image forming apparatus 12 to push an application market icon displayed on an operation panel 602 of the image forming apparatus 12. In the following explanation, a process performed in the image forming apparatus 12 means that the browser interprets JavaScript and executes it.

In step S2, the image forming apparatus 12 acquires application market screen data from the application market providing server 21. The application market screen data include data for displaying a subscription screen (described below) in addition to data for displaying an application view screen 1000 illustrated in FIG. 17.

Figure 17:
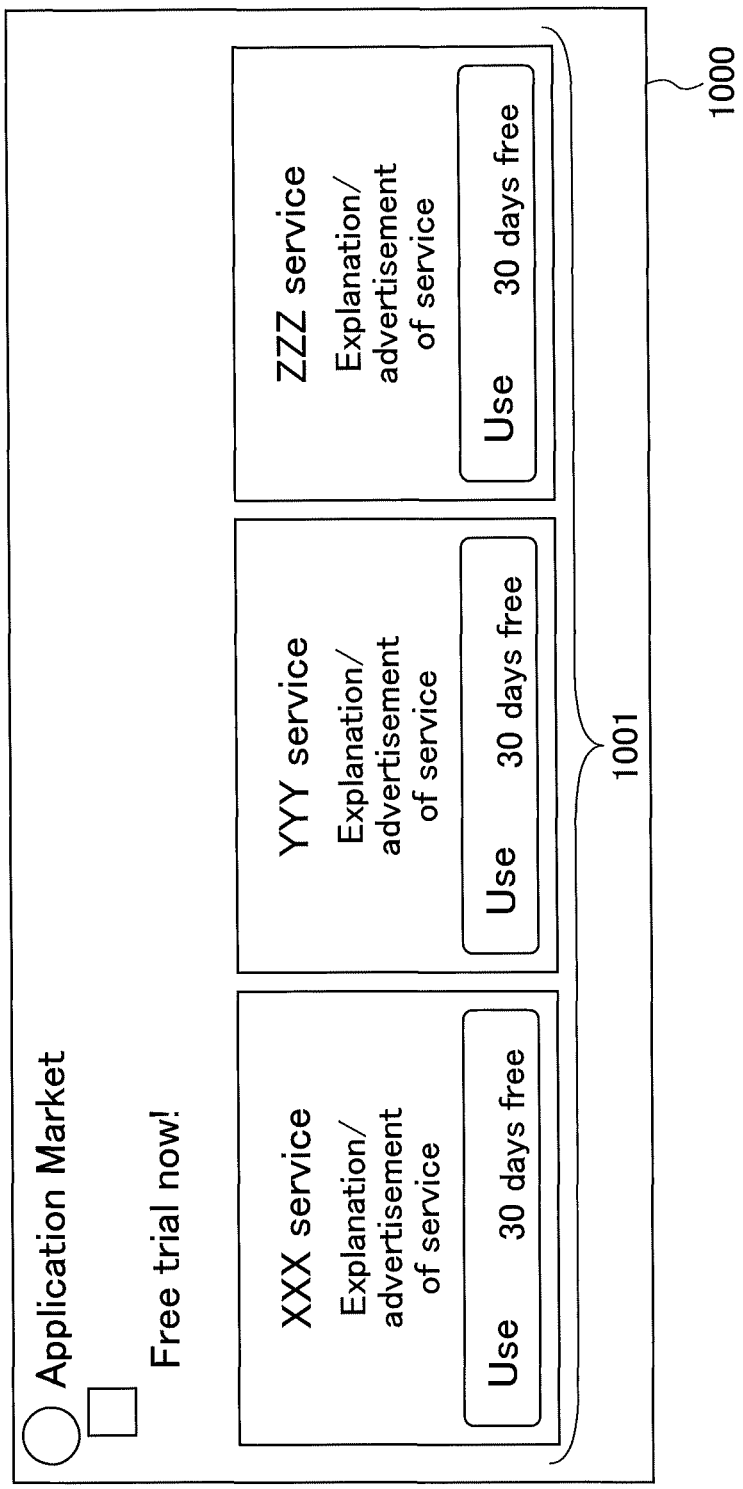
FIG. 17 is an exemplary image chart of an application view screen.

The image forming apparatus 12 displays the application view screen 1000 illustrated in, for example, FIG. 17 on the operation panel 602. FIG. 17 is an exemplary image chart of an application view screen. The application view screen 1000 illustrated in FIG. 17 is an exemplary screen through which the user selects a service for the trial use. A button 1001 for the user to select the service for the trial use is included in the application view screen 1000.

Figure 18:
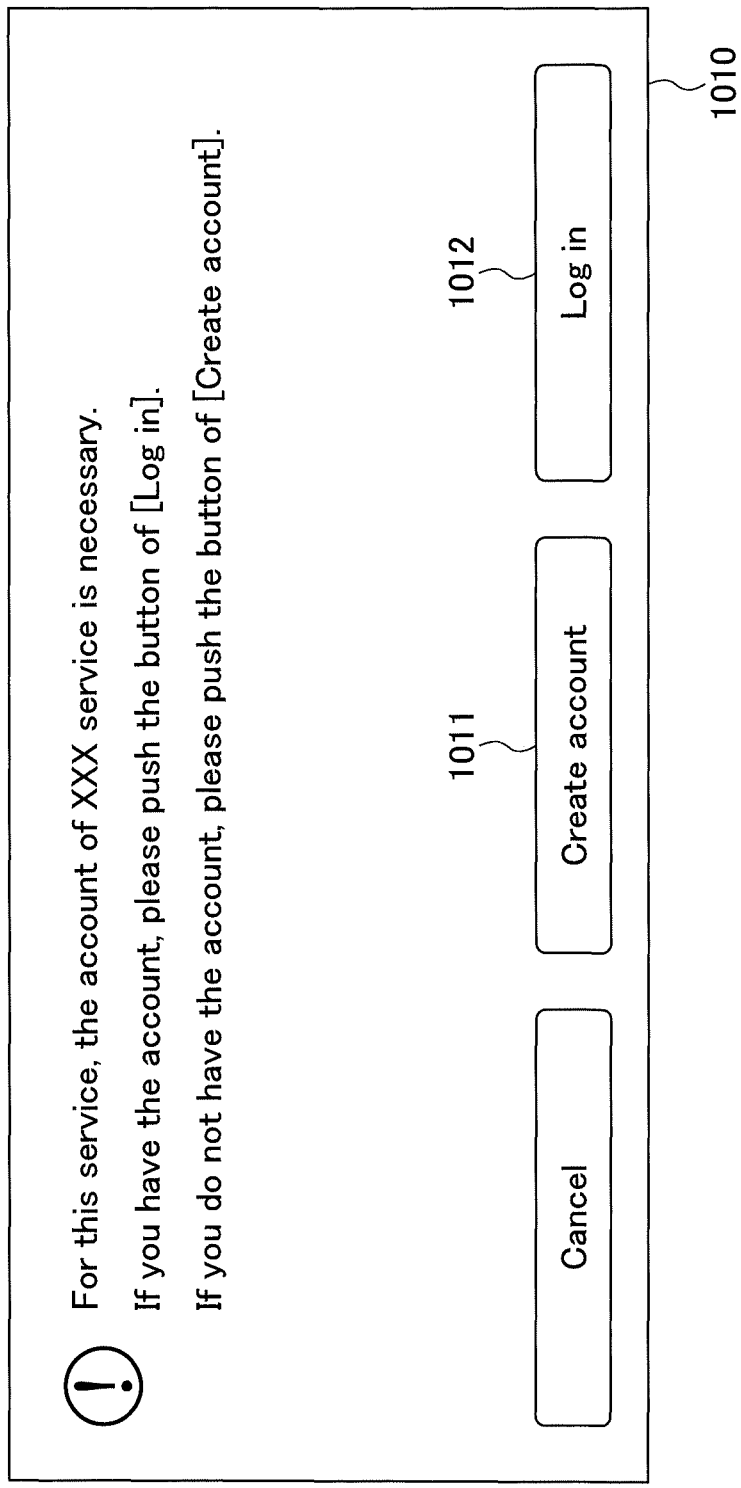
FIG. 18 is an image chart of an exemplary subscription screen.

In step S3, the user operates the image forming apparatus 12 and pushes a button 1001 of "XXX service" for the trial use on the application view screen 1000 displayed on the operation panel 602. The image forming apparatus 12 displays a subscription screen 1010 illustrated in, for example, FIG. 18 on the operation panel 602. FIG. 18 is an image chart of an exemplary subscription screen.

The subscription screen 1010 illustrated in FIG. 18 includes a button 1011 of "Create account" for proceeding to a process of creating an account of "XXX service" for the trial use and a button 1012 of "Log in" for proceeding to a process of logging in using the account of "XXX service" for the trial use.

In the first use case, the user does not have the account. Therefore, the user pushes the button 1011 of "Create account" on the subscription screen 1010 displayed on the operation panel 602 in step S4.

In step S5, the image forming apparatus 12 generates an icon of "XXX service startup" to which the URL of "XXX service" selected by the user is set. For example, the URL "https://xxx.example.com/top?q=service %3Dxxx %26productId%3D12345%26country%3DJP" of "XXX service" is set to the icon of "XXX service startup".

In step S6, the image forming apparatus 12 acquires account creation screen data from the account registration unit 123. The image forming apparatus 12 sets a service type (service), a commodity code (productId), a country (country), and the URL (url) of "XXX service" to a query parameter at a time of acquiring the account creation screen data. For example, the URL is "https://spf.example.com/signup.html?service=xxx&productId=12345&country=JP&url=https%3A%2F%2Fxxx.example.com%2Ftop".

In step S7, the image forming apparatus 12 checks whether the tenant ID is stored or not. The image forming apparatus 12 stores the tenant ID in a case where the image forming apparatus 12 has ever been successfully logged in the service platform providing system 40. The first use case is an example where the tenant has not been opened. Therefore, the image forming apparatus 12 does not store the tenant ID. The image forming apparatus 12 displays the account creation screen 1020 illustrated in, for example, FIG. 19 on the operation panel 602.

Figure 19:
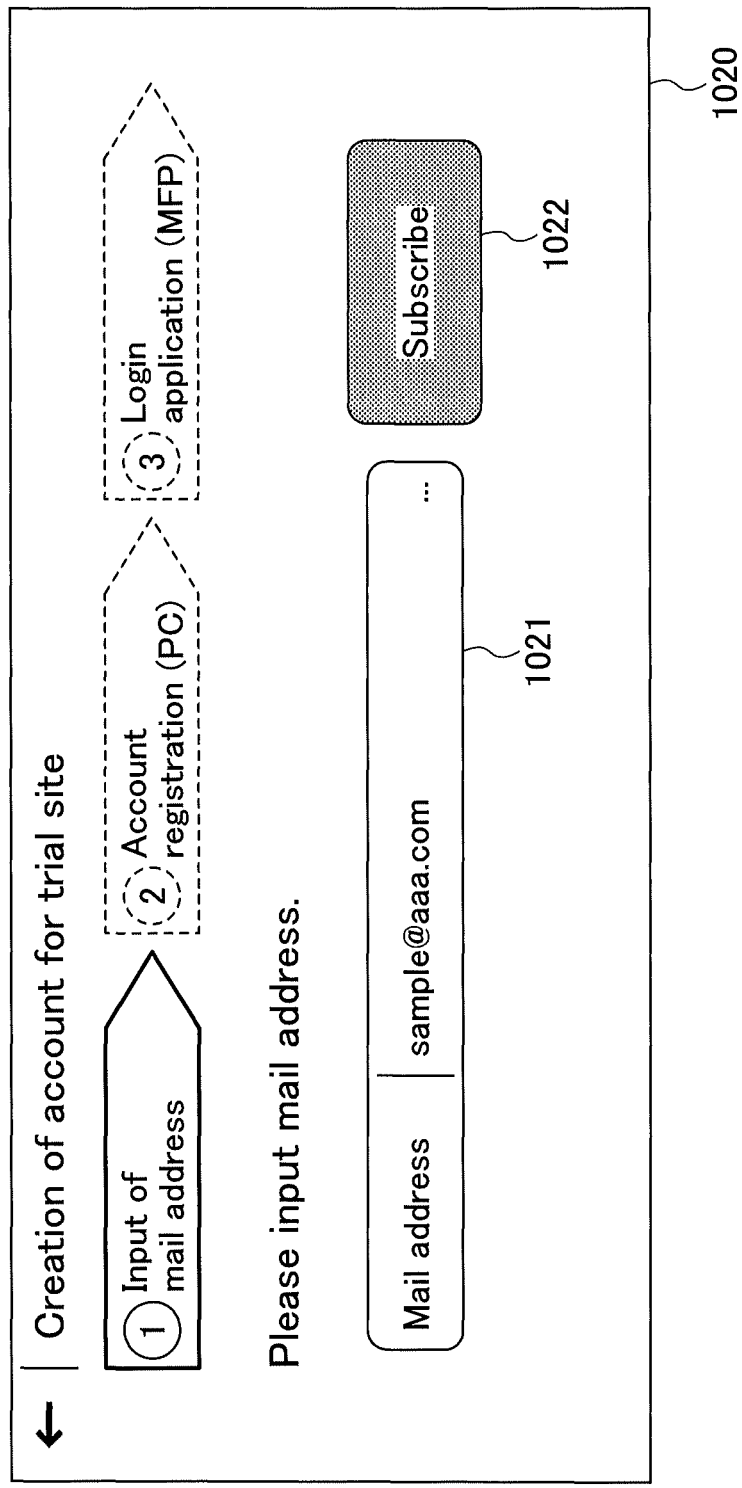
FIG. 19 illustrates an image of an exemplary account creation screen.

FIG. 19 is an exemplary image chart of the account creation screen. The account creation screen 1020 includes a mail address input box 1021 and an icon 1022 of "Subscribe". In step S8, the user inputs a mail address into the mail address entry field 1021 of the account creation screen 102 and pushes the icon 1022 of "Subscribe".

In step S9, the image forming apparatus 12 subscribes to open the tenant to the account registration unit 123. The mail address, the service type, the commodity code, and the country are designated to open the tenant. Referring to step S9, the account registration unit 123 performs the client authentication for the image forming apparatus 12. If the image forming apparatus 12 is not reliable, the account registration unit 123 may return an error.

In step S10, the account registration unit 123 requests the user administration unit 133 to search for the user information while designating the mail address included in the subscription for opening the tenant in step S9. The user administration unit 133 searches the user information memory unit 153 and returns a search result of whether the mail address included in the subscription for opening the tenant in step S9 has been registered to the account registration unit 123. If the mail address has been registered, the account registration unit 123 returns the error to the image forming apparatus 12 so that multiple tenants are not opened for a single mail address.

In step S11, the account registration unit 123 stores subscription information. The subscription information includes the URL (including a random number), the expiry date of the URL, a context=tenant open, the mail address, the service type, the commodity code, and the country. The URL (including the random number) is a URL for displaying an account information input screen (described below). The context is exemplary information for selecting a content of process.

In step S12, the account registration unit 123 sends a mail, in which the URL for displaying the account information input screen (described below) is described, to the mail address included in the subscription for opening the tenant in step S9. If the mail address is not correct, the user cannot receive the mail, and it is possible to prevent the tenant from being erroneously opened.

Figure 20:
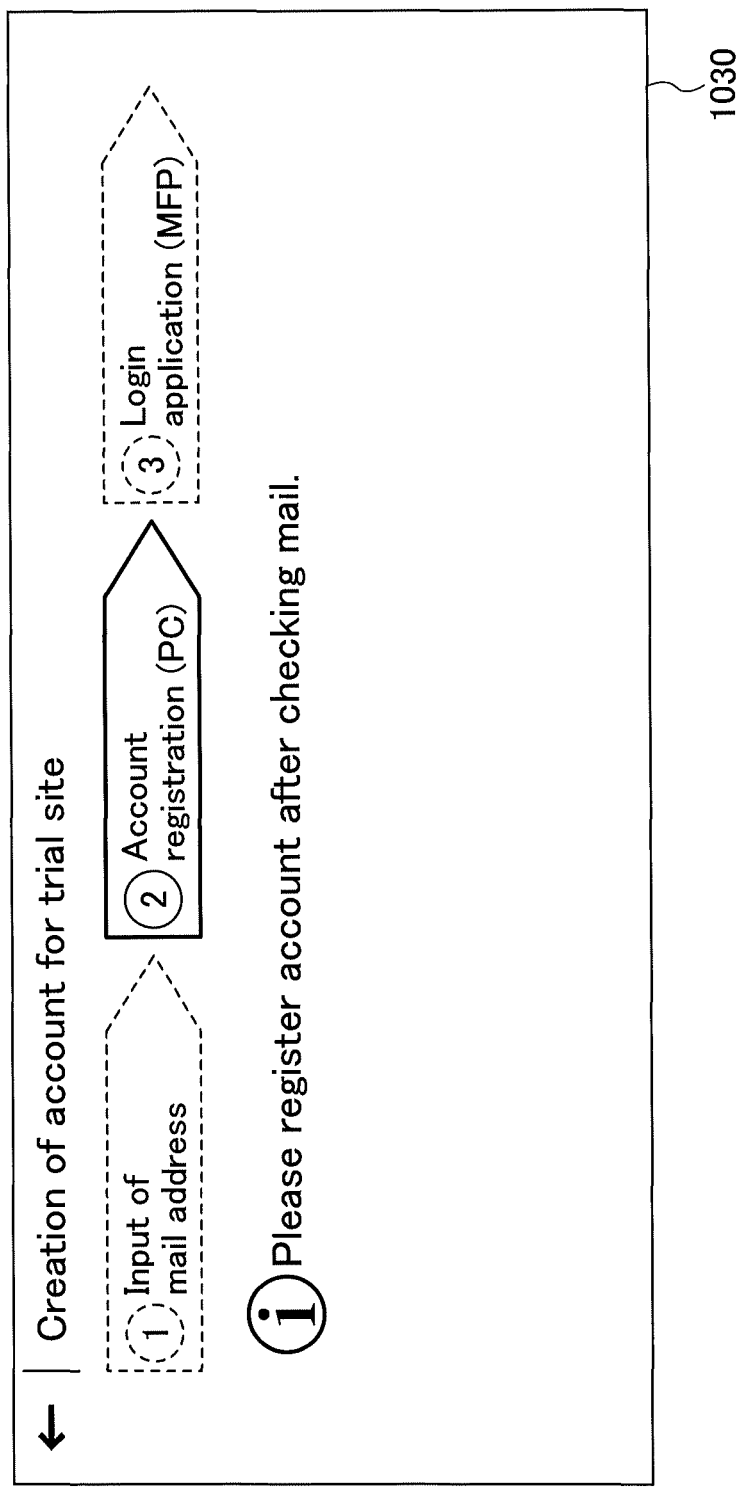
FIG. 20 is an image chart of an exemplary mail transmission completion screen.

Further, in step S13, the image forming apparatus 12 causes the operation panel 602 to display the mail transmission completion screen as illustrated in step S20. FIG. 20 is an image chart of an exemplary mail transmission completion screen. The mail transmission completion screen 1030 includes a message prompting a reader to check the mail and do an account registration.

In step S14, the user operates the user terminal 11 to request an access to the URL for displaying the account information input screen described in the mail. In step S15, the user terminal 11 requests the account registration unit 123 to access the URL for describing the account information input screen described in the mail.

In step S16, the account registration unit 123 reads out the subscription information corresponding to the URL, to which the access is required. The read subscription information is that stored in step S11. On or after step S16, the account registration unit 123 holds the subscription information in association with the session ID (Cookie) or the like.

The account registration unit 123 causes the account information input screen 1040 (see FIG. 21) to be displayed on the display device 502 of the user terminal 11 if the expiry date included in the subscription information does not lapse. On the other hand, if the expiry date included in the subscription information lapses, the account registration unit 123 returns an error to the user terminal 11.

Figure 21:
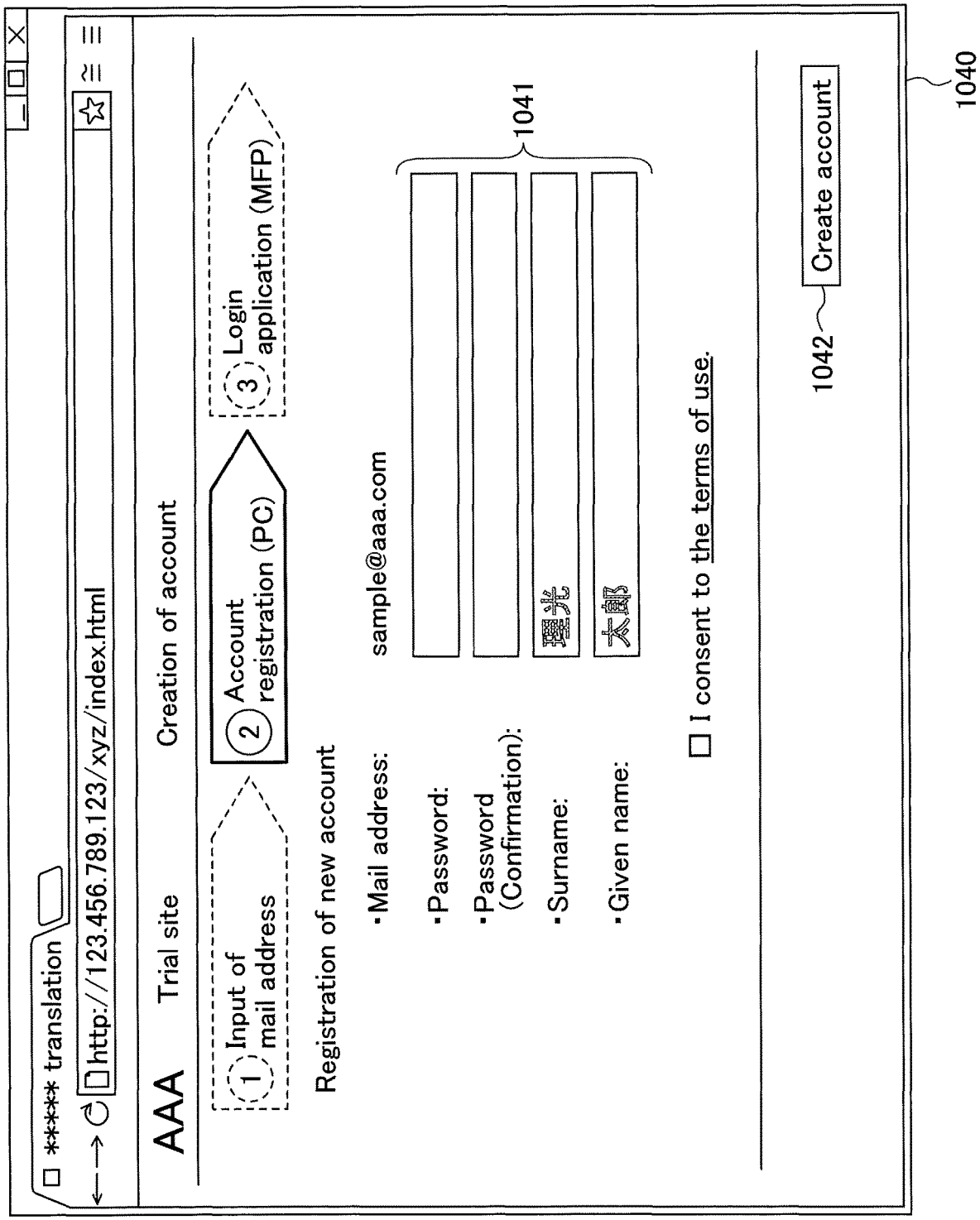
FIG. 21 is an image chart of an exemplary account information input screen.

FIG. 21 is an image chart of an exemplary account information input screen. Referring to FIG. 21, the account information input screen 1040 includes entry fields for a password, a surname, and a given name and a button 1042 of "Account creation".

In step S17, the user operates user terminal 11 to input the password, the surname, and the given name to the entry field 1041, and thereafter pushes the button 1042 of "Account creation". In step S18, the user terminal 11 requests the account registration unit 123 to create an account by designating the password, the surname, and the given name.

In step S19, the account registration unit 123 requests the license administration unit 134 to issue a tenant ID of a trial contract by designating the country. In step S20, the license administration unit 134 requests the license administration server 52 to issue the tenant ID of the trial contract. The license administration unit 134 may collectively request the license administration server 52 to issue the tenant IDs of the trial contracts instead of individually request the license administration server 52 to issue the tenant ID of the trial contract every time.

The license administration server 52 issues the tenant ID of the trial contract and stores the issued tenant ID of the trial contract. Further, the license administration server 52 reports the issued tenant ID of the trial contract to the license administration unit 134. The license administration unit 134 causes the tenant ID of the trial contract to be stored in the license information memory unit 154.

The license administration unit 134 reports the tenant ID of the trial contract to the account registration unit 123. In step S21, the account registration unit 123, to which the tenant ID of the trial contract is reported, designates the tenant ID, the country, and the mail address and requests the license administration unit 134 to activate the tenant ID of the trial contract.

In step S22, the license administration unit 134 activates the tenant ID of the trial contract to be activated, which is stored in the license information memory unit 154. The license administration unit 134 reports the tenant ID of the trial contract to be activated to the license administration server 52 and activates the tenant ID of the trial contract.

In step S23, the account registration unit 123 requests the tenant administration unit 132 to create the tenant by designating the tenant ID of the trial contract. The tenant administration unit 132 creates the tenant and causes the tenant information memory unit 152 to store the tenant information. Here, the tenant information stored in the tenant information memory unit 152 needs not to include all items of the tenant information illustrated in FIG. 10.

Further, in step S24, the account registration unit 123 requests the user administration unit 133 to create the user by designating the tenant ID of the trial contract, the mail address, the password, the surname, the given name, and an administrator role. The user administration unit 133 creates the user information and causes the user information memory unit 153 to store the created user information. Here, the user information stored in the user information memory unit 153 needs not to include all items of the user information illustrated in FIG. 11. Because the tenant is not opened in the first use case, the role becomes the administrator. Because at least one administrator is necessary for each tenant, the role of the first user is the administrator.

In step S25, the account registration unit 123 requests the license administration unit 134 to issue the service license of the trial contract by designating the service type, the commodity code, and the contract mode (the trial).

In step S26, the license administration unit 134 requests the license administration server 52 to issue the license ID of the trial contract. In step S27, the license administration server 52 returns an error in a case where the designated commodity code does not corresponds to the designated service type or the designated contract mode. The license administration server 52 issues the license ID of the trial contract and stores the issued license ID of the trial contract.

Further, the license administration server 52 reports the issued license ID of the trial contract to the license administration unit 134. The license administration unit 134 causes the license information memory unit 154 to store the license ID.

The license administration unit 134 reports the license ID of the trial contract to the account registration unit 123. In step S28, the account registration unit 123, to which the license ID of the trial contract is reported, designates the license ID, and requests the license administration unit 134 to activate the license ID of the trial contract.

In step S29, the license administration unit 134 activates the license ID of the trial contract to be activated, which is stored in the license information memory unit 154. The license administration unit 134 reports the license ID of the trial contract to be activated to the license administration server 52 and activates the license ID of the trial contract.

In step S30, the account registration unit 123 requests the authentication and permission unit 131 to set an access right by designating the mail address, the service type, and an administration and a use as an authority. After the authentication and permission unit 131 sets the access right, the account registration unit 123 sends an account creation completion screen 1050 as illustrated in FIG. 22 to the user terminal 11 and causes the display device 502 of the user terminal 11 to display the account creation completion screen 1050 in step S31.

Figure 22:
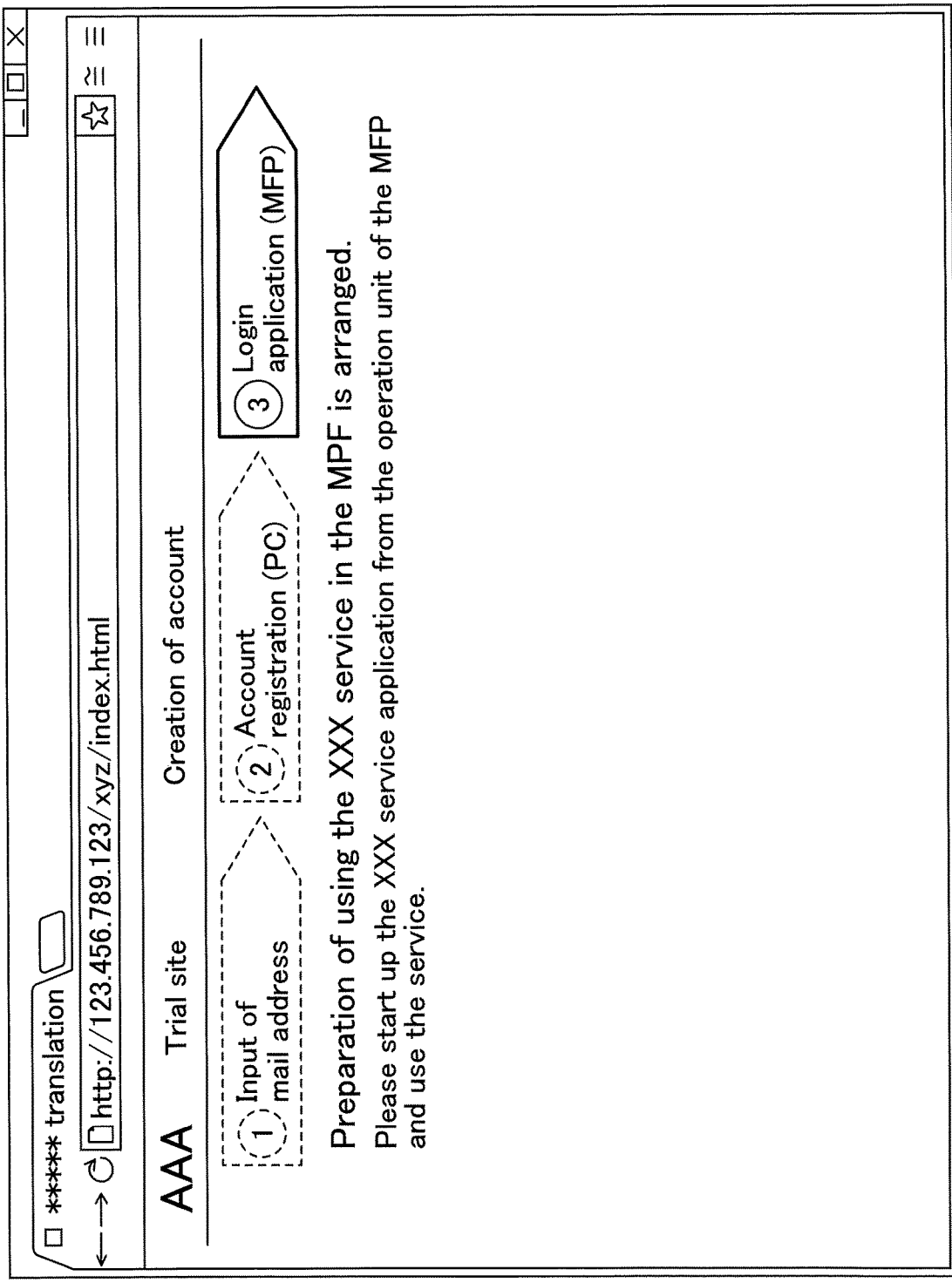
FIG. 22 illustrates an image of an exemplary account creation screen.

FIG. 22 illustrates an image of an exemplary account creation screen. The account creation completion screen 1050 illustrated in FIG. 22 includes a message of reporting that a preparation of using "XXX service" is done.

Figure 23:
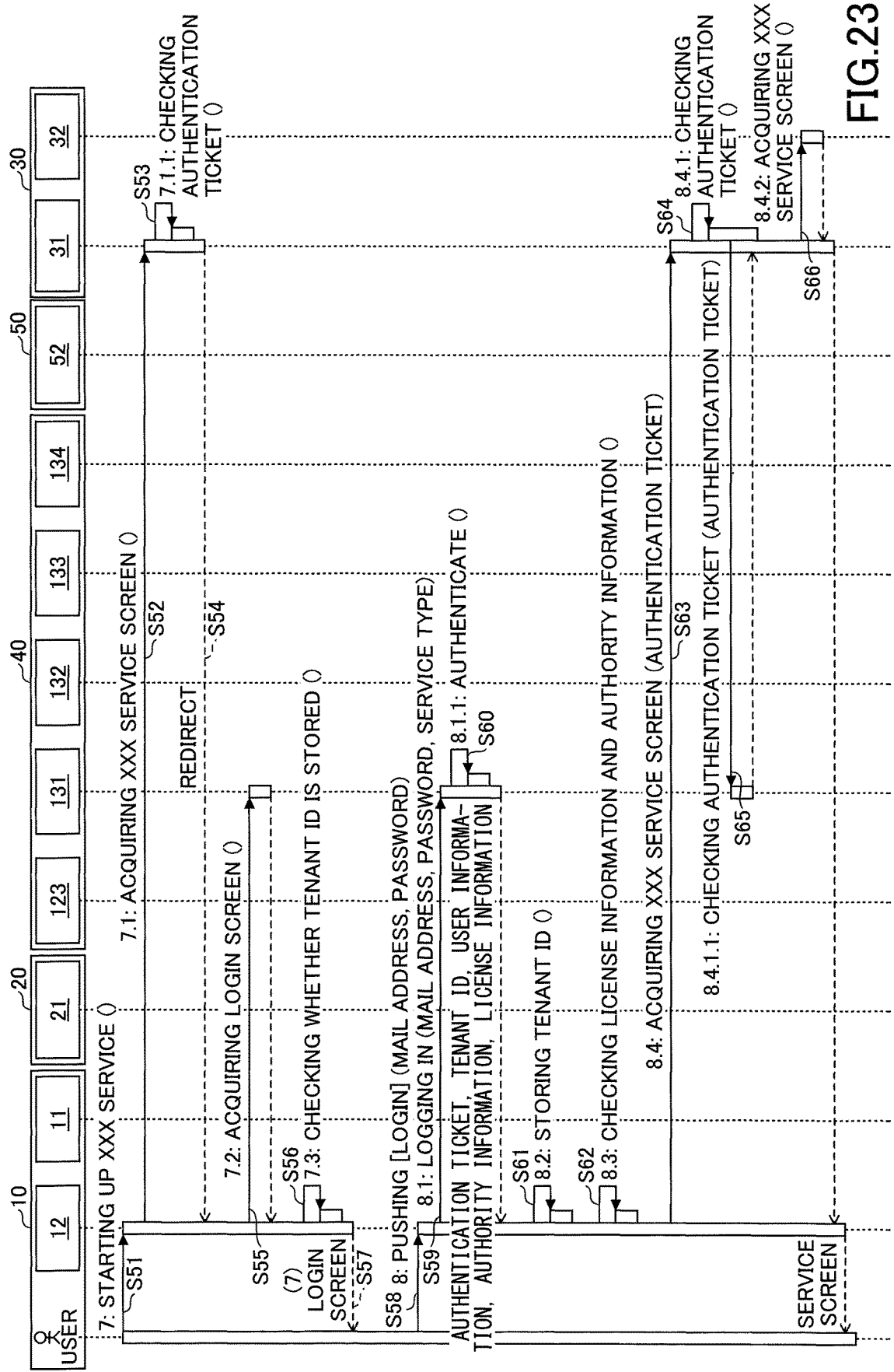
FIG. 23 is a sequence chart of an exemplary procedure where a user subscribing to a trial uses a service.

FIG. 23 is a sequence chart of an exemplary procedure where a user subscribing to the trial uses the service. In step S51, the user operates the image forming apparatus 12 to push, for example, an icon of "XXX service" displayed on the operation panel 602 of the image forming apparatus 12 so as to request a startup of "XXX service".

For example, the URL "https://xxx.example.com/top?q=service%3Dxxx%26productId%3D12345%26country%3DJP" of "XXX service" is set to the icon of "XXX service".

In step S52, the image forming apparatus 12 requests the authentication agent apparatus 31 of the service providing system 30 to acquire screen data of "XXX service". In step S53, the authentication agent apparatus 31 checks whether the authentication ticket is included in the screen data or not. Description is given hereinafter in a case where the screen data do not include the authentication ticket.

Because the authentication ticket is not included, in step S54, the authentication agent apparatus 31 redirects the acquisition request for the screen data of "XXX service" in step S52. The authentication agent apparatus 31 embeds the URL of "XXX service", which is the access destination in step S52, in a query parameter (redirect) in step S54.

In step S55, the image forming apparatus 12 acquires login screen data from the authentication and permission unit 131 of the service platform providing system 40. In step S56, the image forming apparatus 12 checks whether the tenant ID is stored or not. Description is given hereinafter in a case were the tenant ID has not been stored.

Figure 24:
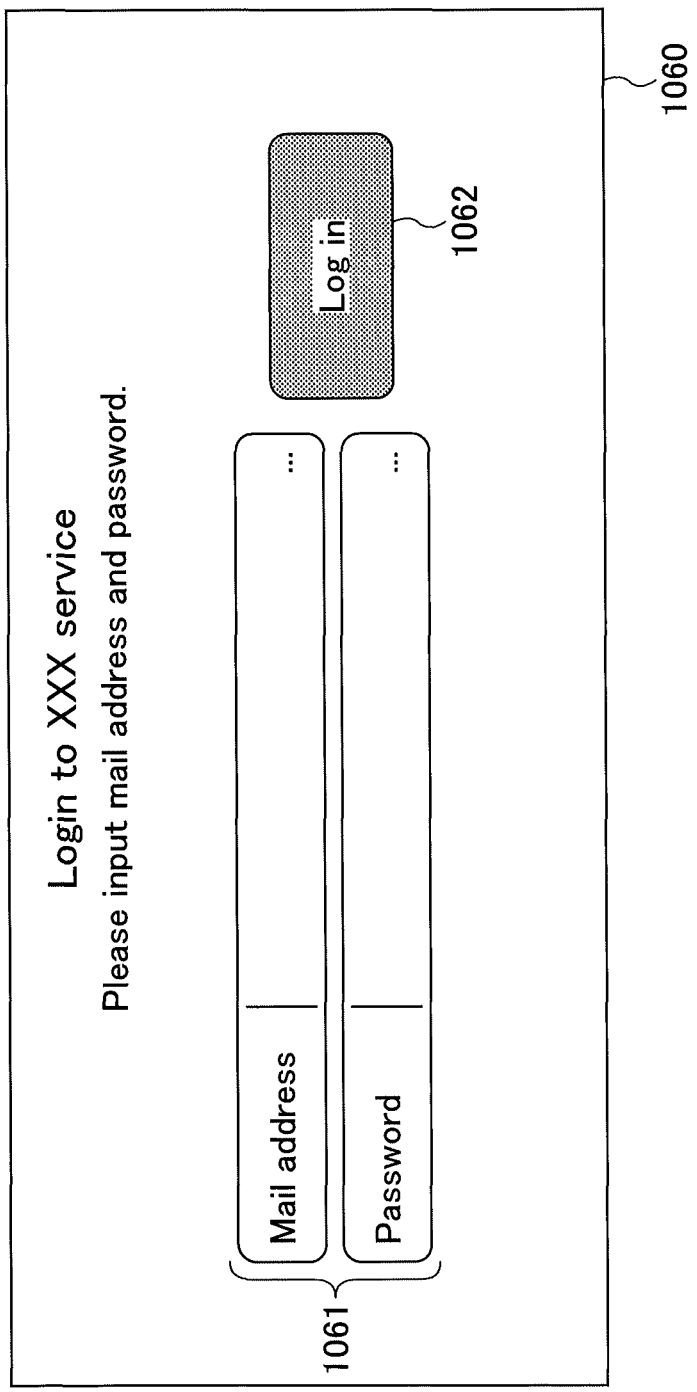
FIG. 24 is an image chart of an exemplary login screen.

In step S57, the image forming apparatus 12 causes the operation panel 602 to display, for example, a login screen 1060 illustrated in FIG. 24. FIG. 24 is an image chart of an exemplary login screen. The login screen illustrated in FIG. 24 includes entry fields 1061 of a mail address and a password and a button 1062 of "Log in". In step S58, the user inputs the mail address and the password into the entry field 1061 of the login screen 1060 and pushes the button 1062 of "Log in".

In step S59, the image forming apparatus 12 requests the authentication and permission unit 131 to log in by designating the mail address, the password, and the service type. For example, the process of step S59 is substantialized by a primitive authentication function and an upper level API reading various information.

In step S60, the authentication and permission unit 131 performs the user authentication by using the mail address, the password, and the service type, which are designated in step S59. If the user authentication is successful, the authentication and permission unit 131 issues the authentication ticket. The authentication and permission unit 131 reports the issued authentication ticket, the tenant ID of the authenticated user, the user information, the authority information, and the license information to the image forming apparatus 12. The user information, the authority information, and the license information area acquired from administration modules of each information in a step which is not illustrated. In step S61, the image forming apparatus 12 stores the reported tenant ID.

In step S62, the image forming apparatus 12 checks the reported license information and the reported authority information. Here, described is a case where a service license of a trial contract of "XXX service" has been registered so as to have a service use authority.

In step S63, the image forming apparatus 12 requests the authentication agent apparatus 31 of the service providing system 30 to acquire the screen data of "XXX service", which includes the authentication ticket. In step S64, the authentication agent apparatus 31 checks whether the authentication ticket is included in the screen data or not.

Description is given hereinafter in a case where the screen data include the authentication ticket. In step S65, the authentication agent apparatus 31 requests the authentication and permission unit 131 to check the authenticity of the authentication ticket. Description is given hereinafter in a case where the authenticity of the authentication ticket can be checked. In step S66, the authentication agent apparatus 31 acquires the screen data of "XXX service" from the service providing apparatus 32 and provides the screen data of "XXX service" to the image forming apparatus 12.

In the first use case, the user without having an opened tenant can do the trial use of the service after the user subscribe to the trial.

<<Second Use Case>>

Figure 25:
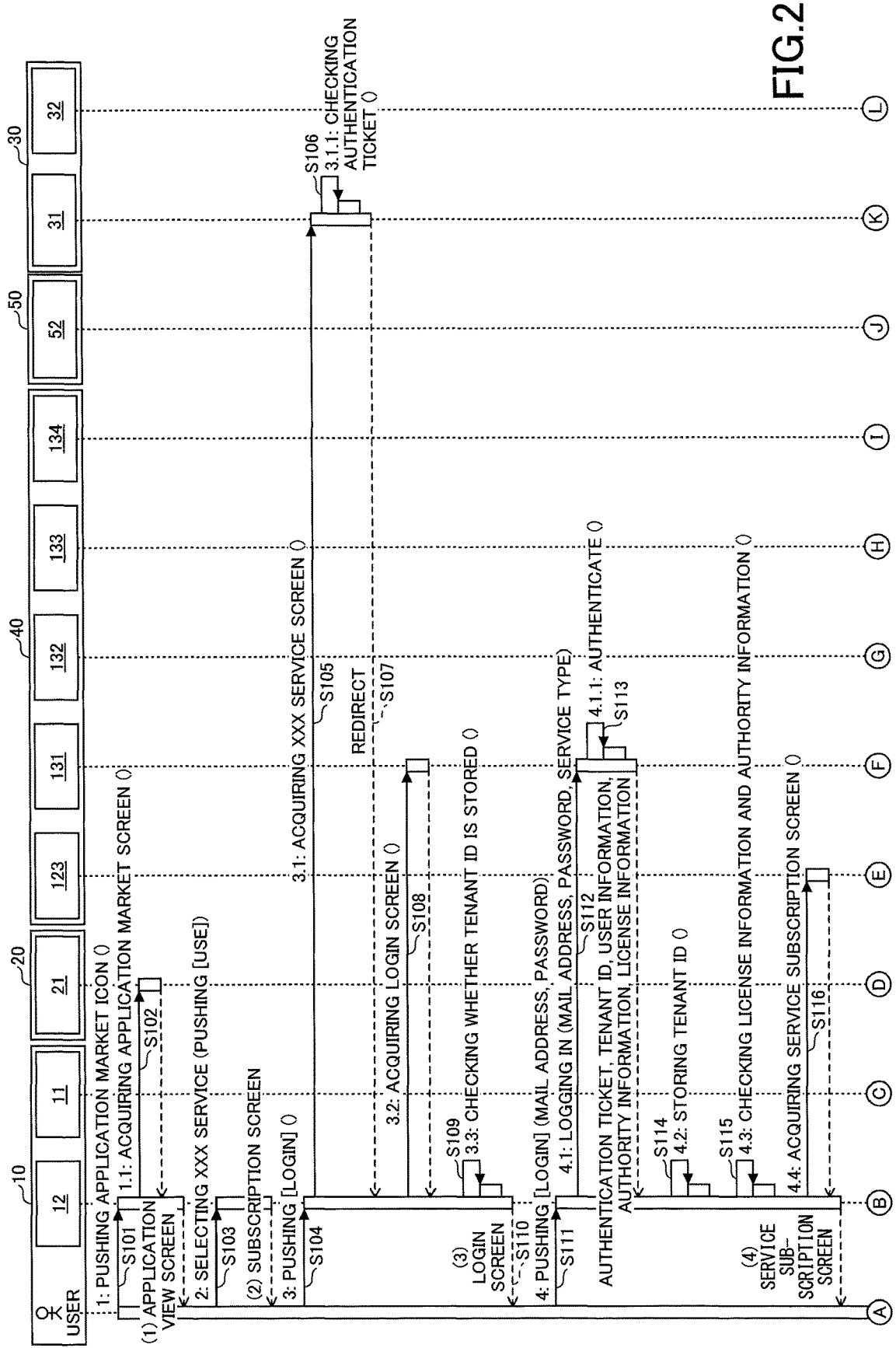
FIG. 25 is a sequence chart of an exemplary procedure where a user having the opened tenant subscribes to a trial and performs a trial use.
Figure 26:
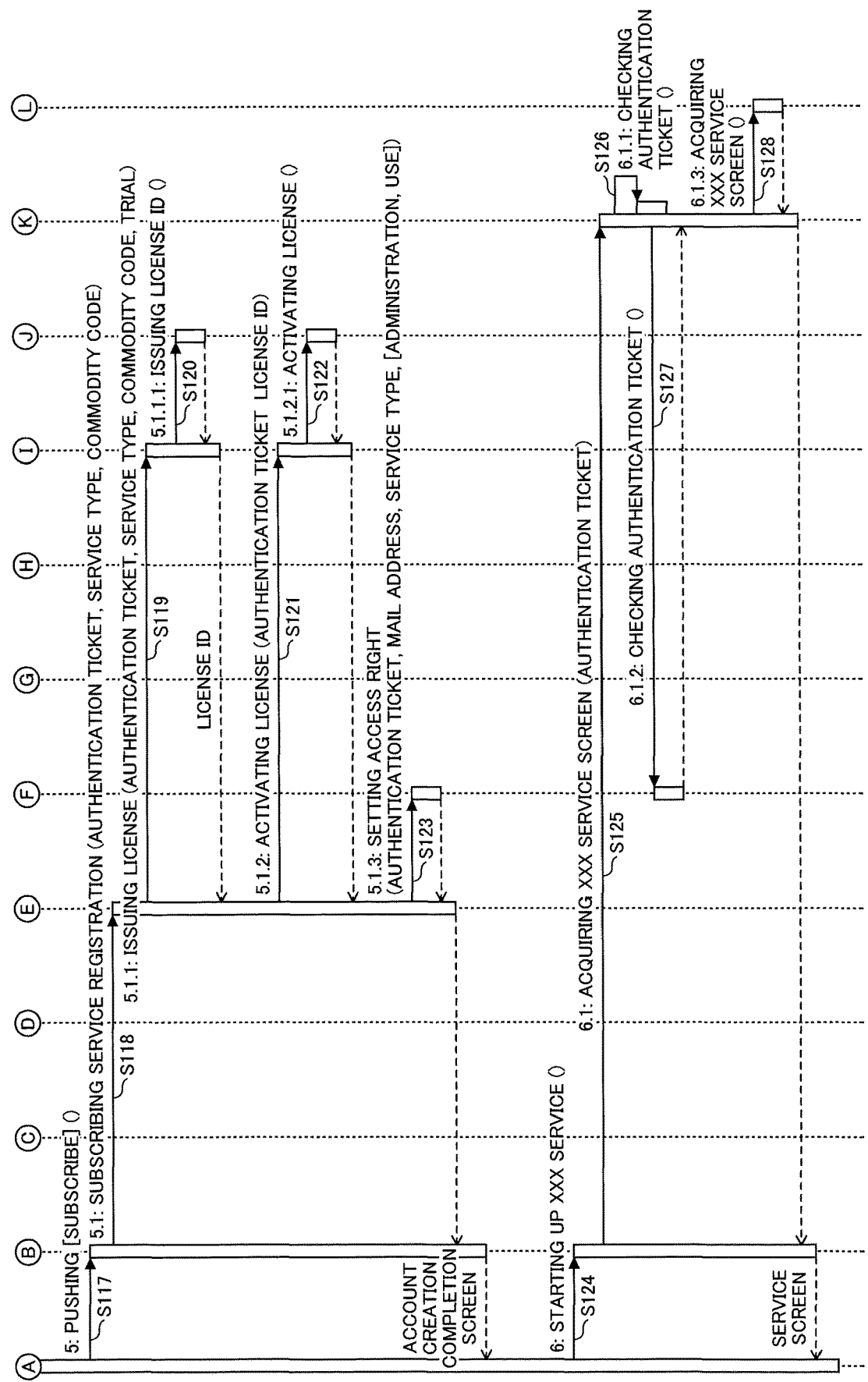
FIG. 26 is another sequence chart of the exemplary procedure where the user having the opened tenant subscribes to the trial and performs the trial use.

FIGS. 25 and 26 are sequence charts of an exemplary procedure where a user having an opened tenant subscribes to the trial and performs the trial use. Because the second use case is similar to the first use case except for a part of the second use case, explanation is appropriately omitted.

The processes of steps S101 to S103 are similar to the processes of steps S1 to S3 of FIG. 15. In the second use case, described below is a case where the user pushes the button 1012 of "Log in" on the subscription screen 1010 displayed on the operation panel 602 in step S104.

For example, the URL of "https://xxx.example.com/top?q=service%3Dxxx%26productId%3D12345%26country%3DJP" of "XXX service" is embedded in the button 1012 of "Log in".

In step S105, the image forming apparatus 12 requests the authentication agent apparatus 31 of the service providing system 30 to acquire the screen data of "XXX service".

Because the processes of steps S106 to S114 are similar to the processes of steps S53 to S61 of FIG. 23, explanation is omitted. In step S115, the image forming apparatus 12 checks the reported license information and the reported authority information. In a case where the service license of "XXX service" is registered and the service use authority exists, the process goes to step S125. In a case where the service license of "XXX service" is registered and the service use authority does not exist, the image forming apparatus 12 displays an error screen on the operation panel 602. In a case where the service license of "XXX service" is registered and the license is expired, the image forming apparatus 12 displays the error screen on the operation panel 602, and disables to conclude the trial contract again if the trial contract or the license for the formal contract is once registered. In a case where the service license of "XXX service" is not registered and a tenant administrator authority does not exist, the image forming apparatus 12 displays the error screen on the operation panel 602. Described below is a case where the service license of "XXX service" is not registered and the tenant administrator authority exists. In step S116, the image forming apparatus 12 acquires service subscription screen data from the authentication and permission unit 131 of the service platform providing system 40.

Figure 27:
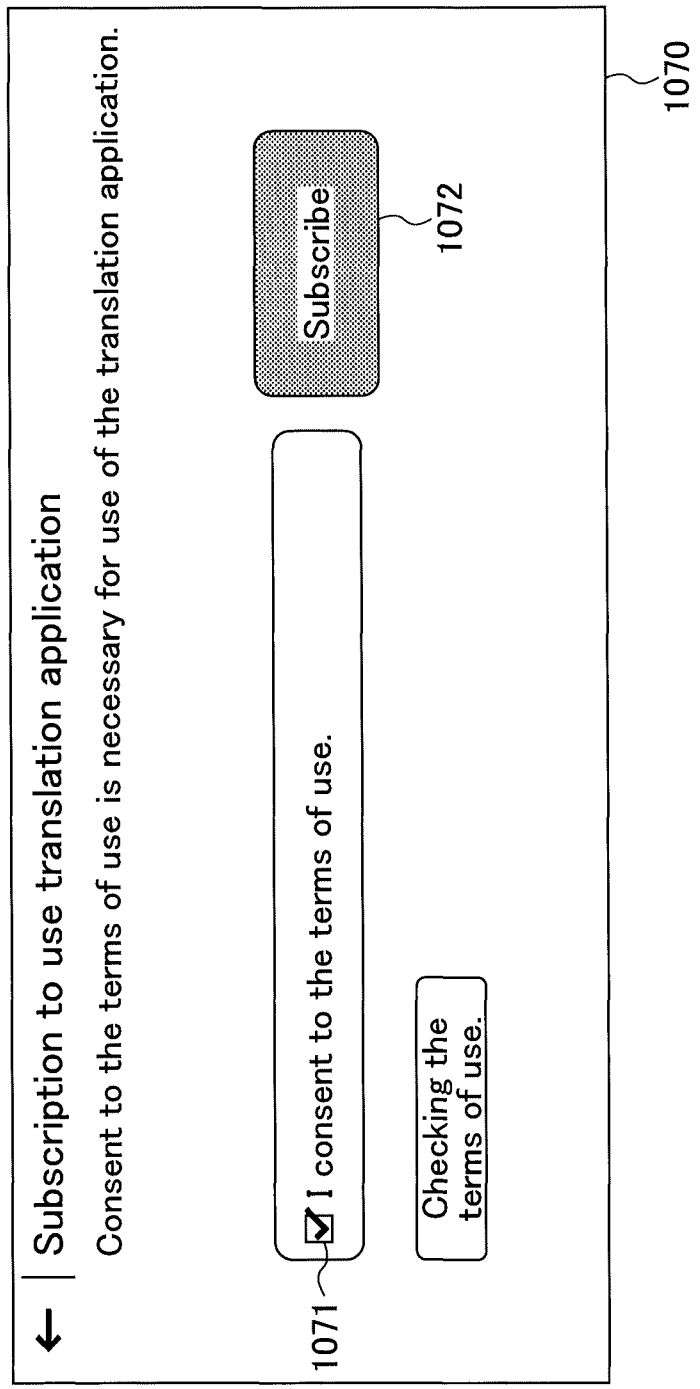
FIG. 27 is an image chart of an exemplary service subscription screen.

The image forming apparatus 12 displays the service subscription screen 1070 illustrated in, for example, FIG. 27 on the operation panel 602. FIG. 27 is an image chart of an exemplary service subscription screen. The service subscription screen 1070 includes a check box 1071 for "I consent to the terms of use" and a button 1072 for "Subscribe".

In step S117, the user marks a check into the check box 1017 and thereafter pushes the button 1072 for "Subscribe". In step S118, the image forming apparatus 12 subscribes to the service registration in the account registration unit 123 by designating the authentication ticket, the service type, and the commodity code. Referring to step S118, the account registration unit 123 performs the client authentication for the image forming apparatus 12. If the image forming apparatus 12 is not reliable, the account registration unit 123 may return the error.

In step S119, the account registration unit 123 requests the license administration unit 134 to issue the service license of the trial contract by designating the authentication ticket, the service type, the commodity code, and the contract mode (the trial). In a case where the role of the user specified from the authentication ticket is not the administrator, the license administration unit 134 returns the error. The tenant specified from the authentication ticket already hold the license of the designated service type, the license administration unit 134 returns the error so as to prevent the trial contracts from being concludes multiple times.

In step S120, the license administration unit 134 requests the license administration server 52 to issue the license ID of the trial contract. The license administration server 52 issues the license ID of the trial contract and stores the issued license ID.

Further, the license administration server 52 reports the issued license ID of the trial contract to the license administration unit 134. The license administration unit 134 causes the license information memory unit 154 to store the license ID.

The license administration unit 134 reports the license ID of the trial contract to the account registration unit 123. In step S121, the account registration unit 123, to which the license ID of the trial contract is reported, designates the authentication ticket and the license ID, and requests the license administration unit 134 to activate the license ID of the trial contract.

In step S122, the license administration unit 134 activates the license ID of the trial contract to be activated, which is stored in the license information memory unit 154. The license administration unit 134 reports the license ID of the trial contract to be activated to the license administration server 52 and activates the license ID of the trial contract.

In step S123, the account registration unit 123 requests the authentication and permission unit 131 to set an access right by designating the authentication ticket, the mail address, the service type, and the administration and the use as the authority. After the authentication and permission unit 131 sets the access right, the account registration unit 123 sends the account creation completion screen 1050 (see FIG. 22)

to image forming apparatus 12 and causes the operation panel 602 to display the account creation completion screen 1050 to be displayed.

In step S124, the user operates the image forming apparatus 12 to push, for example, the icon of "XXX service" displayed on the operation panel 602 of the image forming apparatus 12 so as to request a startup of "XXX service".

In step S125, the image forming apparatus 12 requests the authentication agent apparatus 31 of the service providing system 30 to acquire the screen data of "XXX service". In step S126, the authentication agent apparatus 31 checks whether the authentication ticket is included in the screen data or not.

Description is given hereinafter in a case where the screen data include the authentication ticket. In step S127, the authentication agent apparatus 31 requests the authentication and permission unit 131 to check the authenticity of the authentication ticket. Description is given hereinafter in a case where the authenticity of the authentication ticket can be checked.

In step S128, the authentication agent apparatus 31 acquires the screen data of "XXX service" from the service providing apparatus 32 and provides the screen data of "XXX service" to the image forming apparatus 12.

In the second use case, the user without having the opened tenant can do the trial use of the service after the user subscribes to the trial.

<<Third Use Case>>

Figure 28:
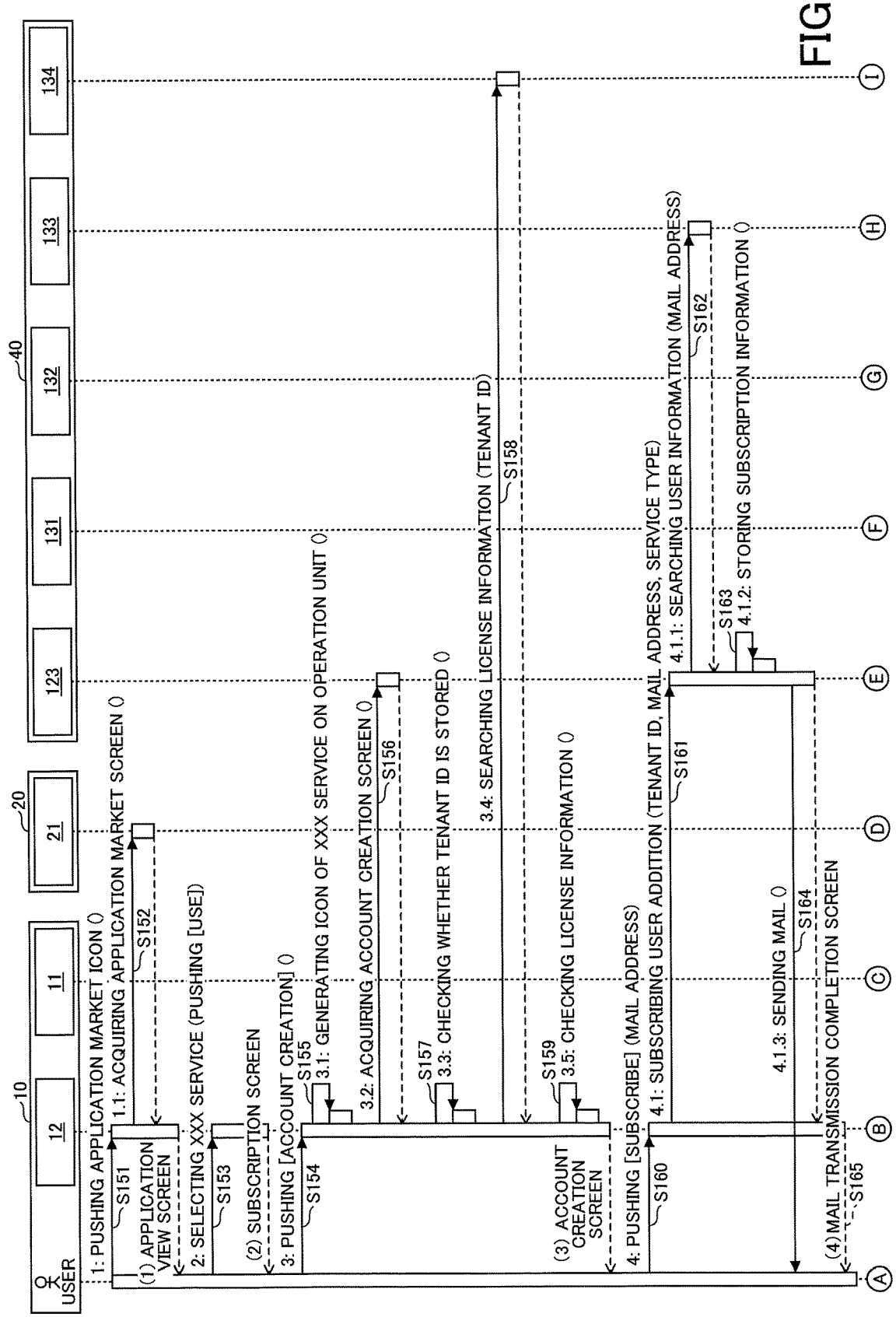
FIG. 28 is a sequence chart of an exemplary procedure where the user having the opened tenant performs a user registration for a service to which the user subscribes to a trial.
Figure 29:
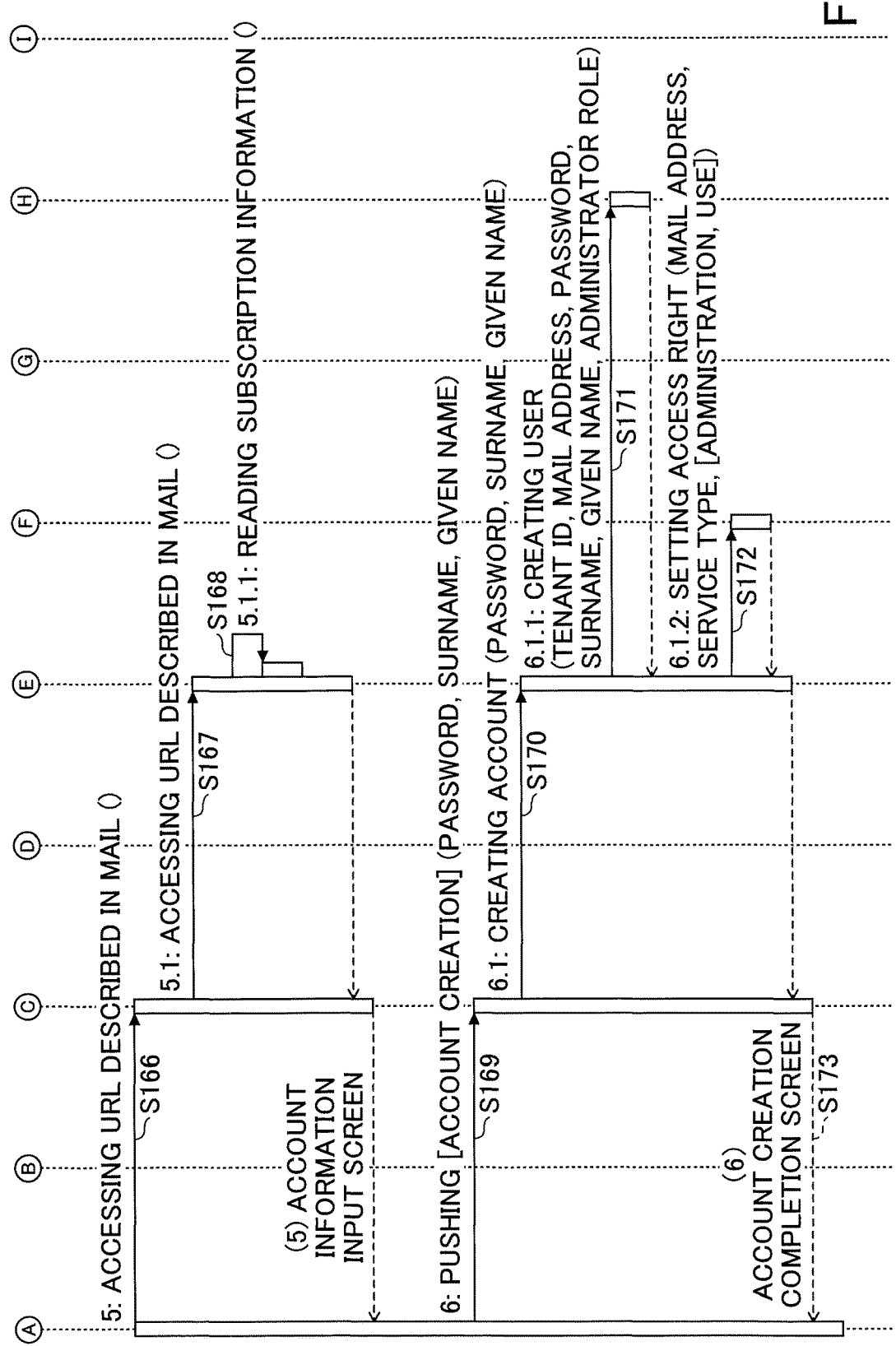
FIG. 29 is another sequence chart of the exemplary procedure where the user having the opened tenant performs the user registration for the service to which the user subscribes to the trial.

FIGS. 28 and 29 are sequence charts of an exemplary procedure where the user having the opened tenant performs a user registration to the service, to which the trial subscription is done. Because the third use case is similar to the first use case except for a part of the third use case, explanation is appropriately omitted.

The processes of steps S151 to S156 are similar to the processes of steps S1 to S6 of FIG. 15. In step S157, the image forming apparatus 12 checks whether the tenant ID is stored or not. Described below is a case where the image forming apparatus 12 stores the tenant ID.

In step S158, the image forming apparatus 12 requests the license administration unit 134 of the service platform providing system 40 to search for the license information by designating the tenant ID. The license administration unit 134 searches for the license information registered in the designated tenant and provides the searched license information to the image forming apparatus 12.

In step S159, the image forming apparatus 12 checks the license information and causes the operation panel 602 to display the account creation screen illustrated in FIG. 19. The image forming apparatus 12 displays an error screen in a case where the account creation cannot be performed. In a case where the account creation cannot be performed and, for example, the number of users in use reaches an upper limit of a quantity (the number of users), for example, an effective trial license does not remain (the formal contract has been concluded, the license deadline has been expired, or a trial subscription has not been conducted).

In step S160, the user inputs a mail address into the mail address entry field 1021 of the account creation screen 102 and pushes the icon 1022 of "Subscribe". In step S161, the image forming apparatus 12 subscribes to a user addition in the account registration unit 123. In subscribing to the user addition, the tenant ID, the mail address, and the service type are designated. Referring to step S161, the account registration unit 123 performs the client authentication for the image forming apparatus 12. If the image forming apparatus 12 is not reliable, the account registration unit 123 may return an error. In a case where the user addition is not conducted by the same reason as in step S159, the account registration unit 123 may return the error.

In step S162, the account registration unit 123 requests the user administration unit 133 to search the user information while designating the mail address included in the subscription of the user addition in step S161. The user administration unit 133 searches the user information memory unit 153 and returns a search result of whether the mail address included in the subscription of the user addition in step S161 has been registered to the account registration unit 123. If the mail address has been registered, the account registration unit 123 returns the error to the image forming apparatus 12 because the user having the same mail address cannot be created.

In step S163, the account registration unit 123 stores subscription information. The subscription information includes the URL (including a random number), the expiry date of the URL, a context=the user addition, the mail address, and the service type. The URL (including the random number) is a URL for displaying the account information input screen illustrated in FIG. 21.

In step S164, the account registration unit 123 sends a mail, in which the URL for displaying the account information input screen in FIG. 21 is described, to the mail address included in the subscription of the user addition in step S121. Further, in step S165, the image forming apparatus 12 causes the operation panel 602 to display the mail transmission completion screen 1030 illustrated in step S20.

In step S166, the user operates the user terminal 11 to request an access to the URL for displaying the account information input screen described in the mail. In step S167, the user terminal 11 requests the account registration unit 123 to access the URL for describing the account information input screen described in the mail.

In step S168, the account registration unit 123 reads out the subscription information corresponding to the URL, to which the access is required. The read subscription information read in step S168 is that stored in step S163. On or after step S168, the account registration unit 123 holds the subscription information in association with the session ID (Cookie) or the like.

The account registration unit 123 causes the account information input screen 1040 (see FIG. 21) to be displayed on the display device 502 of the user terminal 11 if the expiry date included in the subscription information does not lapse. On the other hand, if the expiry date included in the subscription information lapses, the account registration unit 123 returns an error to the user terminal 11.

In step S169, the user operates user terminal 11 to input the password, the surname, and the given name to the entry field 1041, and thereafter pushes the button 1042 of "Account creation". In step S170, the user terminal 11 requests the account registration unit 123 to create an account by designating the password, the surname, and the given name.

Further, in step S171, the account registration unit 123 requests the user administration unit 133 to create the user by designating the tenant ID, the mail address, the password, the surname, the given name, and the administrator role. The user administration unit 133 creates the user and causes the user information memory unit 153 to store the created user information. Because the tenant is opened in the third use case, the role may be an ordinary user.

In step S172, the account registration unit 123 requests the authentication and permission unit 131 to set an access right by designating the mail address, the service type, and the administration and the use as the authority. The authority may only be the use. In a case where the use authority cannot be added by the same reason in step S159, the authentication and permission unit may return an error. After the authentication and permission unit 131 sets the access right, the account registration unit 123 sends the account creation completion screen 1050 as illustrated in FIG. 22 to the user terminal 11 and causes the display device 502 of the user terminal 11 to display the account creation completion screen 1050 in step S31.

Figure 30:
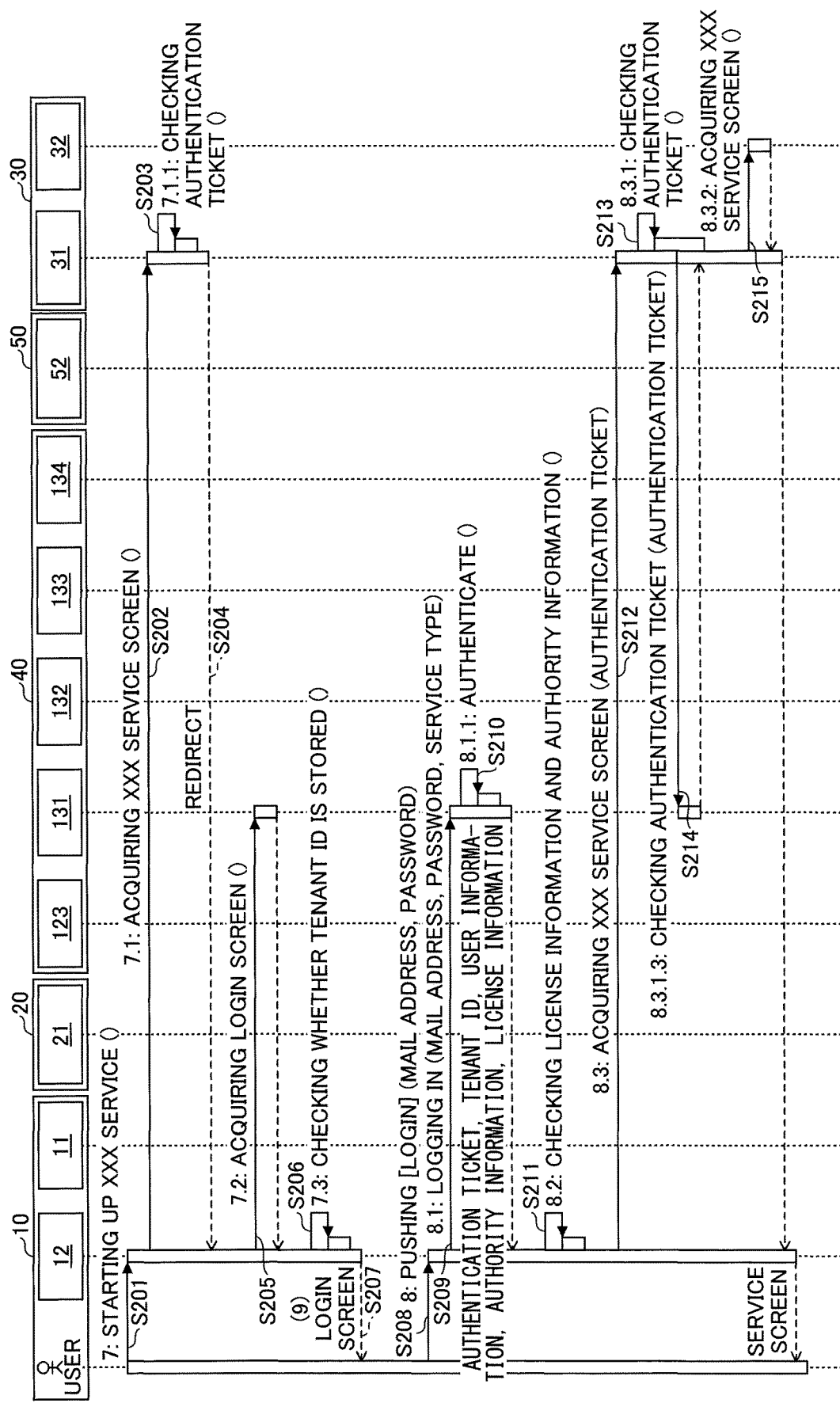
FIG. 30 is a sequence chart of an exemplary procedure where the user who has performed the user registration uses the service.

FIG. 30 is a sequence chart of an exemplary procedure where the user who has performed the user registration uses the service. The processes of steps S201 to S205 are similar to the processes of steps S51 to S55 of FIG. 23.

Figure 31:
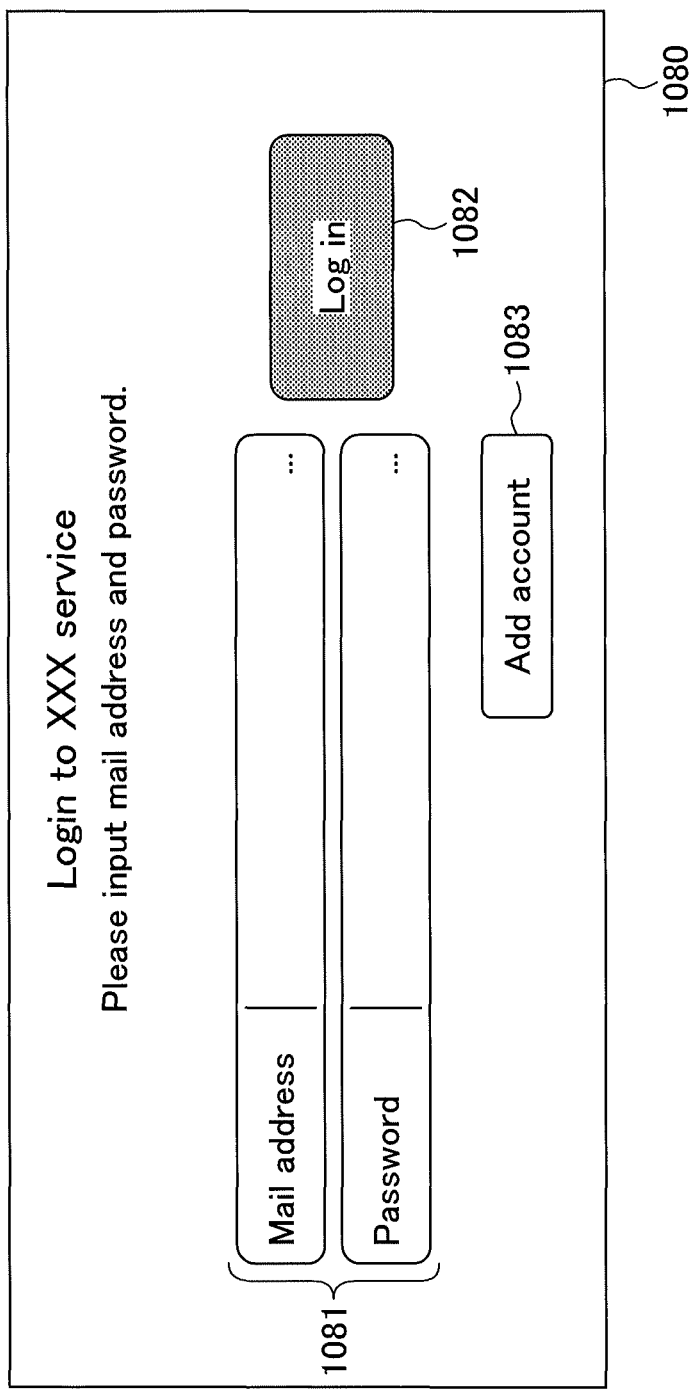
FIG. 31 is an image chart of another exemplary login screen.

In step S206, the image forming apparatus 12 checks whether the tenant ID is stored or not. Description is given hereinafter in a case were the tenant ID has been stored. In step S207, the image forming apparatus 12 causes the operation panel 602 to display, for example, a login screen 1080 illustrated in FIG. 31. FIG. 31 is an image chart of another exemplary login screen.

The login screen 1080 illustrated in FIG. 31 has an button of "Add account" into the login screen 1060 illustrated in FIG. 24. In a case where the button of "Add account" is pushed, the process goes to step S156 illustrated in FIG. 28.

In step S208, the user inputs the mail address and the password into the entry field 1081 of the login screen 1080 and pushes a button 1082 of "Log in". In step S209, the image forming apparatus 12 requests the authentication and permission unit 131 to log in by designating the mail address, the password, and the service type.

In step S210, the authentication and permission unit 131 performs the user authentication by using the mail address, the password, and the service type, which are designated in step S209. If the user authentication is successful, the authentication and permission unit 131 issues the authentication ticket. The authentication and permission unit 131 reports the issued authentication ticket, the tenant ID of the authenticated user, the user information, the authority information, and license information to the image forming apparatus 12. The user information, the authority information, and the license information area acquired from administration modules of each information in a step which is not illustrated.

In step S211, the image forming apparatus 12 checks the reported license information and the reported authority information. Here, described is a case where the service license of the trial contract of "XXX service" has been registered so as to have the service use authority. The processes on or after step S212 are similar to the processes on or after step S63 of FIG. 23.

The third use case is that a user having the opened tenant can conduct a user registration for the service for which the trial subscription has been done to conduct the trial use of the service.

<<Screen Transition>>

Figure 32:
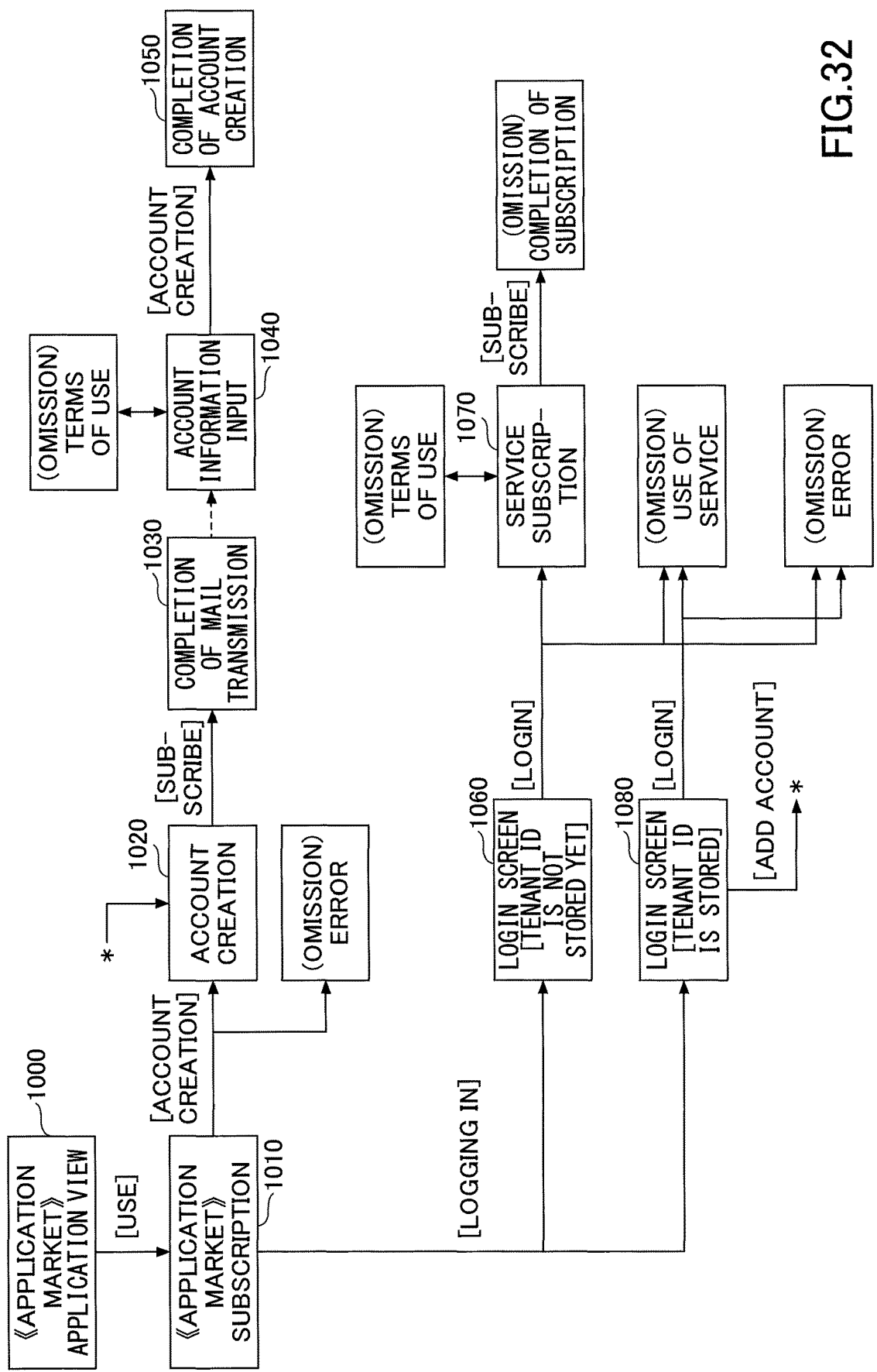
FIG. 32 illustrates an exemplary screen transition in an information processing system of the first embodiment.

A screen transition in the first to third use cases may be illustrated in FIG. 32. FIG. 32 illustrates an exemplary screen transition in the information processing system of the first embodiment. When the user pushes the button of "Use" by selecting the service for the trial use while the application view screen 1000 is displayed on the operation panel 602 of the image forming apparatus 12, the display transits to a subscription screen 1010.

When the button 1011 of "Create account" on the subscription screen 1010 is pushed, the display of the operation panel 602 of the image forming apparatus 12 is transited to the account creation screen 1020 or the error screen.

For example, in the first use case, the display transits to the account creation screen 1020 in a case where the tenant ID is not stored in the image forming apparatus 1020. In the third use case, the display transits to the account creation screen 1020 in a case where the tenant ID is stored in the image forming apparatus 1020, and the number of users using the license information does not reach the quantity (the number of users).

In the third use case, the display transits to the error screen 1020 in a case where the tenant ID is stored in the image forming apparatus 12, and the number of users using the license information reaches the quantity (the number of users). Further, in a case where there is no activated trial license due to the conclusion of the formal contract, the expiry of the license deadline, or no trial subscription, the display transits to the error screen. In a case where no trial subscription is done, the license may be automatically issued.

In a case where the icon 1022 of "Subscribe" on the account creation screen 1020 is pushed, the display of the operation panel 602 of the image forming apparatus 12 is transited to the mail transmission completion screen 1030. When the URL described in the mail so as to be used to display the account information input screen is clicked by the user, the user terminal 11 causes the display device 502 to display the account information input screen 1040.

When the user terminal 11 receives an operation of displaying a terms of use, the account information input screen 1040 is transited to a terms of use screen. Therefore, the user can check the content of the terms of use. When the button 1042 of "Create account" on the account information input screen 1040 is pushed, the user terminal 11 causes the display device 502 to display the account creation completion screen 1050.

In the first use case, when the account creation completion screen 1050 is displayed in the display device 502 of the user terminal 11, the tenant open, the user creation, the license issuance, and the authority setup are completed. In the first use case, when the account creation completion screen 1050 is displayed in the display device 502 of the user terminal 11, the tenant open, the user creation, the license issuance, and the authority setup are completed.

When the button 1012 of "Log in" on the subscription screen 1010 is pushed, the image forming apparatus 12 causes the operation panel 602 to display the login screen 1060 in a case where the tenant ID is stored. Further, the image forming apparatus 12 causes the operation panel 602 to display the login screen in a case where the tenant ID is stored.

When the button 1060 of "Log in" on the login screen 1060 is pushed, the image forming apparatus 12 causes the operation panel 602 to display the service subscription screen 1070, a service use screen, or the error screen.

In a case where the license is not yet registered, and there is a tenant administrator authority, the image forming apparatus 12 causes the operation panel 602 to display the service subscription screen 1070. When an operation of displaying the terms of use is received from the user, the image forming apparatus 12 causes the service subscription screen 1070 to be transited to the terms of use screen.

When the button 1072 of "Subscribe" on the service subscription screen 1070 is pushed, the image forming apparatus 12 causes the operation panel 602 to display a subscription completion screen. In the second use case, when the subscription completion screen is displayed on the operation panel 602, the license issuance and the authority setup are completed.

In a case where the license has been issued and there is the service use authority, the image forming apparatus 12 causes the operation panel 602 to display the service use screen. In a case where the license is not yet registered, and there is no tenant administrator authority, the image forming apparatus 12 causes the operation panel 602 to display the error screen. In a case where the license has been issued and either the license deadline expires or there is no tenant administrator authority, the image forming apparatus 12 causes the operation panel 602 to display the error screen.

When the button 1082 of "Login" on the login screen 1080, to which the display transits in the case where the tenant ID is stored, the image forming apparatus 12 causes the operation panel 602 to display the service use screen or the error screen.

In a case where the license has been issued and there is the service use authority, the image forming apparatus 12 causes the operation panel 602 to display the service use screen. In a case where the license has been issued and there is no service use authority, the image forming apparatus 12 causes the operation panel 602 to display the error screen. In a case where the license has not been issued, the image forming apparatus 12 causes the operation panel 602 to display the error screen.

In a case where the button 1083 of "Add account" on the login screen 1080 is pushed, the image forming apparatus 12 causes the display to transit to the account creation screen 1020 illustrated in FIG. 19 and proceeds to the process of creating the account.

[General Overview]

In the information processing system 1 of the first embodiment, regarding the trial subscription for the service provided to the electronic apparatus such as the image forming apparatus 12, the account registration function for the trial which can be performed by the user terminal 11 and the image forming apparatus 12 is substantialized.

The information processing system 1 can perform a high convenience for the user because the trial subscription can be done from the user terminal 11 and the image forming apparatus 12. Further, the service platform providing system 40 of the information processing system 1 of the first embodiment is provided with the account registration application 114 and the account registration unit 123, which are provided to substantialize the account registration function for the trial. A developer of the service to be provided to the electronic apparatus can easily develop the service which enables the trial use by using the account registration function for the trial, which is provided by the service platform providing system 40.

Second Embodiment

Within the first embodiment, the account registration to the service platform providing system 40 is performed from the user terminal 11 or the image forming apparatus 12. Within a second embodiment, the account registration to the service platform providing system 40 is performed from the application market providing server 21. Because the second embodiment is similar to the first embodiment except for a portion of the second embodiment, the explanation of the same portion is appropriately omitted.

Figure 33:
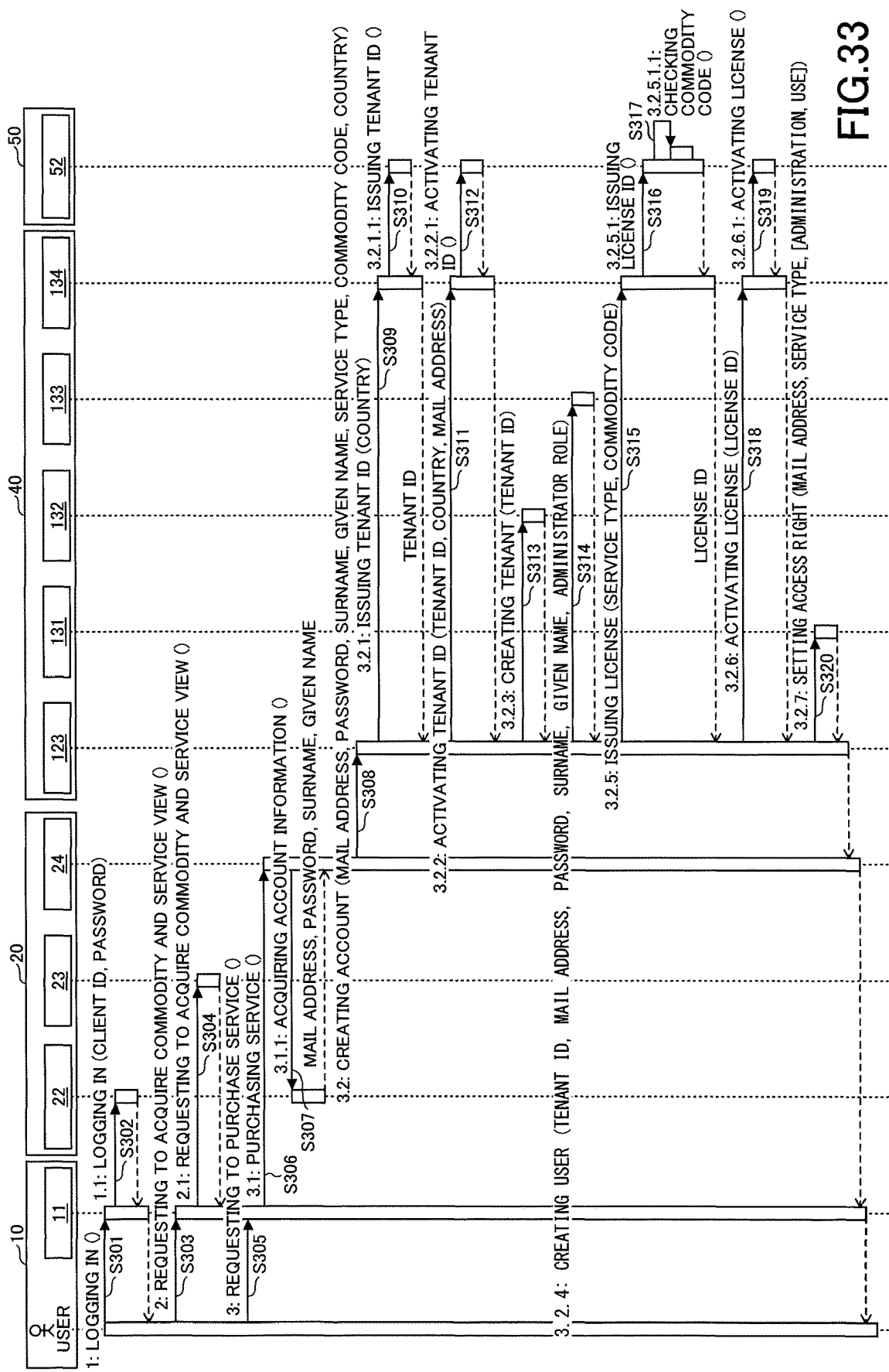
FIG. 33 is a sequence chart of an exemplary procedure where the user performs a procedure of subscribing to a trial by performing an account registration from an application market.

FIG. 33 is a sequence chart of an exemplary procedure where the user performs a procedure of subscribing to the trial by performing the account registration from an application market. In step S301, the user operates the user terminal 11 to request the application market providing system 20 to log in. In step S302, the user terminal 11 requests the application market providing system 20 to log in by designating the client ID for the application market providing system 20 and the password. A client administration unit 22 of the application market providing system 20 performs an authentication using a designated ID and a designated password and permits a user who has successfully authenticated to log in.

The user who is permitted to log in operates the user terminal 11 in step S303 to request to acquire a commodity and service view. In step S304, the user terminal 11 requests a commodity administration unit 23 of the application market providing system 20 to acquire the commodity and service view. The commodity administration unit 23 causes the display device 502 of the user terminal 11 to display the commodity and service view.

In step S305, the user operates the user terminal 11 and requests to purchase the service from the commodity and service view. The user terminal 11 requests the contract administration unit 24 of the application market providing system 20 to purchase the service. In step S307, the contract administration unit 24 requests the client administration unit 22 to acquire the account information and acquire the mail address, the password, the surname, and the given name. The contract administration unit 24 may cause the user to input the password instead of acquiring the password from the client administration unit 22. For the application market providing system 20 and the service platform providing system 40, a system of single sign on (SSO) may be used.

In step S308, the contract administration unit 24 requests the account registration unit 123 of the service platform providing system 40 to create the account by designating the mail address, the password, the surname, the given name, the service type, the commodity code, and the country. Because the processes in or after step S309 except for step S315 are similar to the processes in or after step S19, an explanation is omitted.

Referring to the sequence chart of FIG. 33, the request for the account creation in step S308 uses the important API for the account registration such as the tenant open, the user creation, and the license issuance. Therefore, the access control is necessary.

Referring to the sequence chart of FIG. 33, the account registration can be simplified by concluding the trial contract and the formal contract by online and enabling the account registration to be automatically performed. If the request is from a reliable electronic apparatus, the service platform providing system 40 may permit the account registration without an additional credit.

In a case where the formal contract is concluded online, it is necessary to provide the credit and to further register client information in the application market providing system 20. Therefore, if the account registration for the formal contract is performed online, a collaboration with the reliable application market providing system 20 is necessary for the substantialization.

Step S315 differs from step S25 illustrated in step S25 at a point that the contract mode needs not to be sent. Because the request is from the reliable application market providing system 20, the license is issued by trusting the designated commodity code.

The necessity of the credit may be determined by a difference in a client information registration in the application market providing system 20. For example, only the trial license is issued for a client who has been registered by a simple registration without the credit. The formal contract license may be additionally issued for a client who has been registered along with the credit and a payment method.

In the service platform providing system 40, the difference of the client information registration in the application market providing system 20 cannot be determined. Therefore, the contract mode of the license to be issued is not checked on the side of the service platform providing system 40 but controlled on the side of the application market providing system 20.

Figure 34:
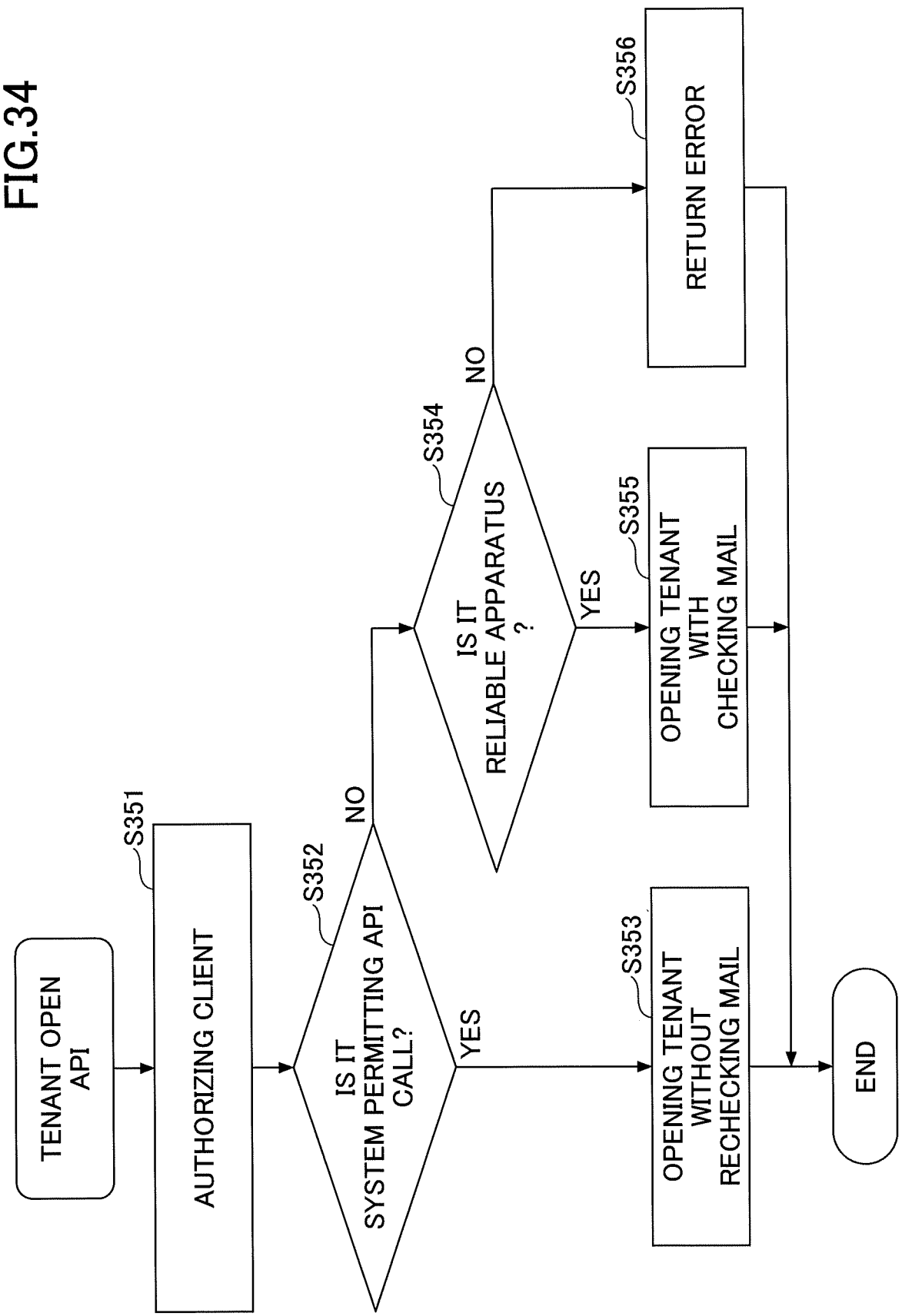
FIG. 34 is a flowchart of an exemplary access control at a time of opening a tenant.

FIG. 34 is a flowchart of an exemplary access control at a time of opening the tenant. The account registration unit 123 of the service platform providing system 40 performs the client authentication in step S351.

In step S352, if the request is from a system, to which an API call is permitted, such as the application market providing system 20, the account registration unit 123 proceeds to step S353 and opens the tenant without checking the mail address.

If the request is not from a system, to which the API call is permitted, the account registration unit 123 proceeds to step S354. In step S354, the request is from a reliable apparatus, the account registration unit 123 proceeds to step S355 and opens the tenant after checking the mail address. In step S354, the request is not from the reliable apparatus, the account registration unit 123 proceeds to step S356 and returns the error.

Figure 35:
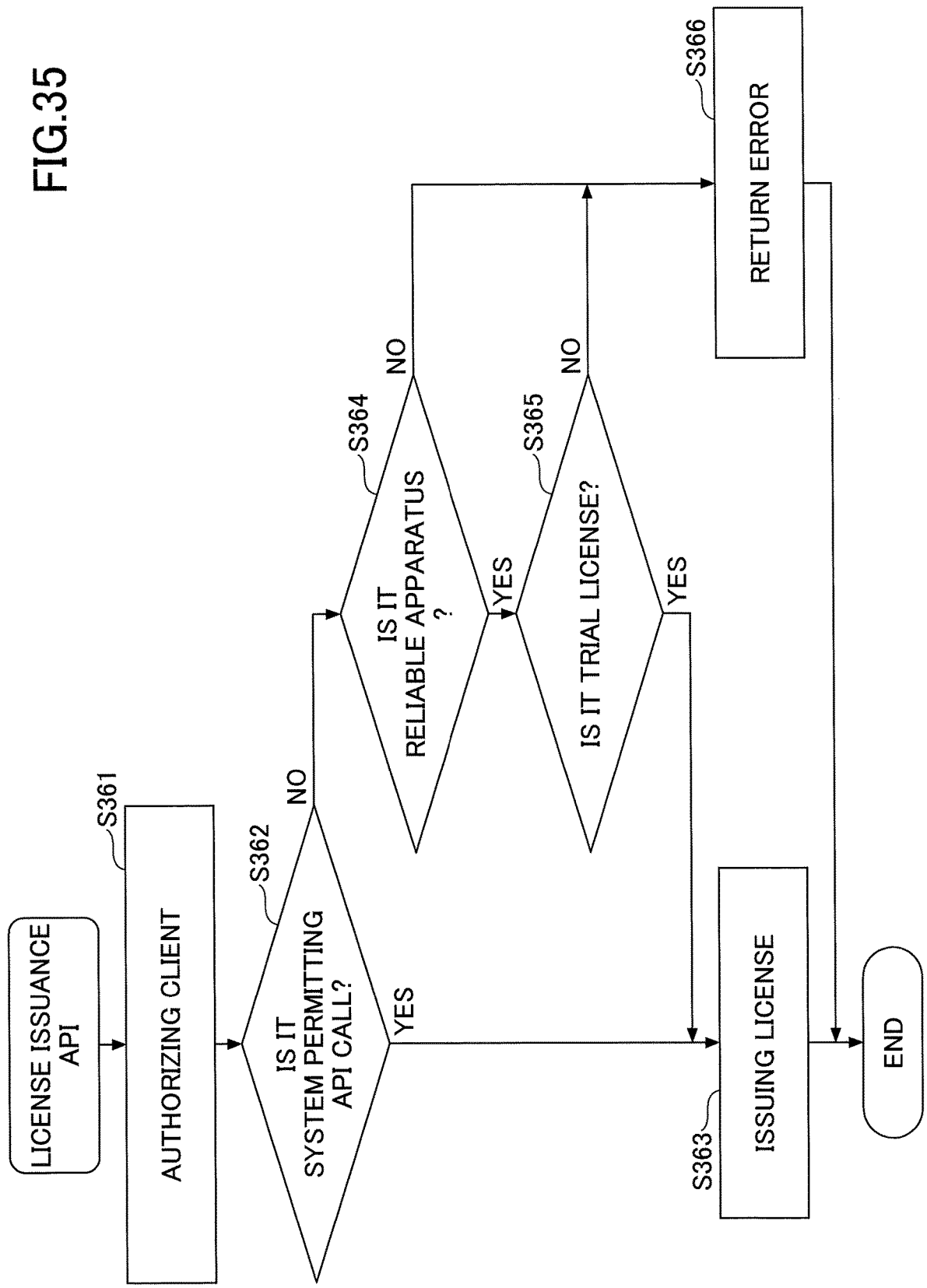
FIG. 35 is a flowchart of an exemplary access control at a time of issuing a license.

FIG. 35 is a flowchart of an exemplary access control at a time of issuing the license. The account registration unit 123 performs the client authentication in step S361. In step S362, if the request is from a system, to which the API call is permitted, such as the application market providing system 20, the account registration unit 123 proceeds to step S363 and issues the license.

If the request is not from a system, to which the API call is permitted, the account registration unit 123 proceeds to step S364. In step S364, the request is not from the reliable apparatus, the account registration unit 123 proceeds to step S365. In step S365, the request is a request of issuing the trial license, the account registration unit 123 proceeds to step S363 and issues the trial license.

In step S364, the request is not from the reliable apparatus, the account registration unit 123 proceeds to step S366 and returns the error. In step S365, the request is not the request of issuing the trial license, the account registration unit 123 proceeds to step S366 to return the error. The checking of the commodity code in step S27 of FIG. 16 corresponds to step S365.

[General Overview]

In the information processing system 1 of the second embodiment, the account registration of registering the trial license and the formal contract license can be performed by the application market providing system 20.

The tenant administration unit 132, the user administration unit 133, and the license administration unit 134 are examples of an administration unit. The image forming apparatus 12 is an example of a service use apparatus. The account registration unit 123 is an example of an account registration unit. The authentication and permission unit 131 is an example of an authentication unit.

[Appendix]

According to the embodiment of the present invention, there are provided:

(1) An information processing system comprising:
a service use apparatus, and
at least one information processing apparatus providing a service to the service use apparatus, wherein the at least one information processing apparatus includes an administration unit configured to administer whether a service is provided to a service use apparatus using an organization, a license, and a user, an account registration unit configured to receive a subscription for a trial use of the service from the service use apparatus and perform an account registration for the administration unit so that the trial use from the service use apparatus is enabled, and an authentication unit configured to return information of the organization, the license, and the user, which are administered by the administration unit, to the service use apparatus in a case where an authentication, which is performed using information of the user administered by the administration unit based on a login request requested by the service use apparatus, is successful, wherein the service use apparatus stores information of the organization acquired from the authentication unit, and switches over an input screen of inputting information necessary for the login request to log in the authentication unit depending in whether the information of the organization is stored or not in a case where the authentication using the authentication unit is successful;

(2). The information processing system according to (1), wherein the service use apparatus has a structure of receiving a transition request of transiting to a screen for performing the account registration of the user is provided in the input screen of inputting the information necessary for the login request to log in the authentication unit in a case where the information of the organization is stored;

(3) The information processing system according to (1), wherein the service use apparatus receives an account registration request from a screen of performing the account registration, wherein the service use apparatus requests the account registration unit to perform the account registration of the organization, the license, and the user in a case where the information of the organization is not stored, wherein the service use apparatus requests the account registration unit to perform the account registration of the user in a case where the information of the organization is stored;

(4) The information processing system according to (3), wherein the service use apparatus requests the administration unit to acquire information of the license in the case where the information of the organization is stored, wherein the service use apparatus requests the account registration unit to perform the account registration of the user in a case where the organization holds the license of the trial use;

(5) The information processing system according to (1), wherein the service use apparatus receives the login request from the input screen, wherein the service use apparatus requests the account registration unit to perform a license registration in a case where the license of the service does not exist in the information of the license received from the authentication unit, wherein the service use apparatus requests the information processing apparatus to acquire a use screen of the service in a case where the license of the service exists; and (6) A computer program representing a sequence of instructions, which when executed by a computer, the instructions cause the computer to perform as:

an administration unit configured to administer whether a service is provided to a service use apparatus using an organization, a license, and a user; and an account registration unit configured to receive a subscription for a trial use of the service from the service use apparatus and perform an account registration for the administration unit so that the trial use from the service use apparatus is enabled.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

What is claimed is:

1. An information processing system comprising:
    a server system including at least one server; and
    an image forming apparatus including
        a scanner to scan a document,
    wherein the server system configured to
        receive user specifying information that is input via an input screen displayed on a user terminal connected to at least the server system over an internet,
        automatically issue a trial license, based on the receiving the input user specifying information, the trial license being enabled to use a service provided by the server system and including an execution of scanning of a document by using the scanner of the image forming apparatus,
    wherein, the image forming apparatus configured to
        display a login screen to input the user specifying information via an operation panel of the image forming apparatus,
        display, in case an authentication based on the user specifying information is successful, a service screen to use the service, in a trial use based on the issued trial license, including an execution of scanning the document by the scanner, and
        execute the scanning of the document when using the service.

2. The information processing system according claim 1, wherein the server system is configured to automatically issue organization information corresponding to the user specifying information, in accordance with receiving the user specifying information.

3. The information processing system according claim 2, wherein the organization information issued in accordance with the receiving of the user information is tenant information.

4. The information processing system according claim 2, wherein the server system sends the organization information to the image forming apparatus in accordance with logging in for using the service through the login screen, and
wherein the image forming apparatus store the organization information in a storage of the image forming apparatus.

5. The information processing system according claim 1, wherein the server system configured to issue organization information and trial license information when creating a user account for using service by a first user, and confirm whether the number of users corresponding to the trial license information is received the upper limit when creating an additional account for using the service by second user, by using the organization information stored in the image forming apparatus, and wherein, in case the number of users corresponding to the trial license information reached the upper limit, an error screen is displayed on an operation panel of the image forming apparatus.

* * * * *